(12) United States Patent
Goettl et al.

(10) Patent No.: US 11,725,742 B1
(45) Date of Patent: Aug. 15, 2023

(54) INTELLIGENTLY CONTROLLED POOL CYCLING VALVE

(71) Applicant: COX GOETTL VALVE LLC, Phoenix, AZ (US)

(72) Inventors: Steven James Goettl, Phoenix, AZ (US); John M. Goettl, Phoenix, AZ (US)

(73) Assignee: COX GOETTL VALVE LLC, Phoenix, AZ (US)

( * ) Notice: Subject to any disclaimer, the term of this patent is extended or adjusted under 35 U.S.C. 154(b) by 204 days.

(21) Appl. No.: 17/219,856

(22) Filed: Mar. 31, 2021

Related U.S. Application Data

(63) Continuation of application No. 17/160,985, filed on Jan. 28, 2021.

(51) Int. Cl.
*F16K 11/072* (2006.01)
*F16K 15/02* (2006.01)
*E04H 4/12* (2006.01)

(52) U.S. Cl.
CPC .............. *F16K 11/072* (2013.01); *E04H 4/12* (2013.01); *F16K 15/025* (2013.01)

(58) Field of Classification Search
CPC ...... F16K 11/02; F16K 11/074; F16K 15/025; F16K 11/072; E04H 4/12
See application file for complete search history.

(56) References Cited

U.S. PATENT DOCUMENTS

| | | | | |
|---|---|---|---|---|
| 3,642,022 A | * | 2/1972 | Kirby | F16K 31/1635 137/119.03 |
| 4,592,379 A | ‡ | 6/1986 | Goettl | E04H 4/169 137/627 |
| 4,817,656 A | ‡ | 4/1989 | Gould | F16K 11/166 137/627 |
| 5,826,616 A | ‡ | 10/1998 | Golden | F16K 11/07 251/351 |

(Continued)

OTHER PUBLICATIONS

Webb, Scott, Save the backwash! A new invention conserves the thousands of gallons of water lost each year in a pool's sand filter backwash. If adopted, cit ould save billions, Aqua Magazine, Oct. 2020, pp. 83-88, Madison, WI, USA.‡

*Primary Examiner* — Jessica Cahill
(74) *Attorney, Agent, or Firm* — Booth Udall Fuller, PLC; Kenneth C. Booth

(57) ABSTRACT

A pool cycling valve system with a pool cycling valve, a plurality of water zones, an interface, and a microcontroller. The pool cycling valve has a valve body with an inlet port and a plurality of outlet ports. Each of the plurality of water zones is configured to fluidly couple with a respective outlet port of the plurality of outlet ports. The interface is configured to receive input from a user for a user-selected sequence for activating each water zone, a user-selected duration of activate time per water zone, and a number of water pressure cycles for a particular water zone to receive prior to activation of a subsequent water zone. The interface is configured to communicate the input to the microcontroller. The microcontroller is configured to intelligently and (Continued)

selectively discharge water to each of the plurality of water zones based on the input received from the interface.

20 Claims, 27 Drawing Sheets

(56) References Cited

U.S. PATENT DOCUMENTS

| | | | | |
|---|---|---|---|---|
| 6,189,556 | B1 ‡ | 2/2001 | Blake | E04H 4/12 |
| | | | | 137/627 |
| 6,625,824 | B1 * | 9/2003 | Lutz | E04H 4/12 |
| | | | | 137/625.21 |
| 8,820,355 | B2 * | 9/2014 | Sutton | F16K 31/52483 |
| | | | | 137/119.07 |
| 9,222,274 | B1 * | 12/2015 | Goettl | E04H 4/12 |
| 9,625,041 | B1 ‡ | 4/2017 | Lopez | F16K 31/535 |
| 10,641,401 | B1 ‡ | 5/2020 | Lopez | F16K 11/074 |
| 2011/0225717 | A1 * | 9/2011 | Malinasky, Jr. | E04H 4/169 |
| | | | | 251/366 |
| 2013/0248034 | A1 * | 9/2013 | Zhou | F16K 11/02 |
| | | | | 137/871 |
| 2016/0238143 | A1 | 8/2016 | Lopez | |
| 2017/0071443 | A1 ‡ | 3/2017 | Boyer | F16K 11/074 |
| 2019/0301636 | A1 ‡ | 10/2019 | Taylor | E04H 4/1236 |
| 2021/0053018 | A1 ‡ | 2/2021 | Dyer | D06F 39/022 |

\* cited by examiner
‡ imported from a related application

INTELLIGENTLY CONTROLLED POOL CYCLING VALVE

CROSS REFERENCES TO RELATED APPLICATIONS

This application is a continuation-in-part of U.S. patent application Ser. No. 17/160,985 entitled "Pool Cycling Valve" to Goettl et. al. that was filed on Jan. 28, 2021, now pending, the disclosure of which is hereby incorporated herein by this reference.

TECHNICAL FIELD

Aspects of this document relate generally to pool cycling valves, and more specifically to a pool cycling valve which is rotated selectively and incrementally by water flow through the valve.

BACKGROUND

Pools of water often have a variety of systems which require water flow to operate. For example, a pool of water might have various water features, such as waterfalls and fountains, as well as systems used for pool maintenance, such as water filters and cleaning systems. Existing pool valves are used to direct water through these systems. However, the structure of these pool valves causes high pressure loss. Existing pool valves are controlled through the use of turbines, gears, and other rotating parts which are rotated by the flow of water. This constant drag on the flow of water increases the pressure requirements of the system. Due to the increased pressure requirements, fewer water systems can be run by a single pump. Large amounts of energy are therefore consumed by running multiple pumps.

In addition to the lack of efficiency in energy use, existing pool valves also provide poor control over the system to the user. For example, existing pool valves do not allow for variable amounts of time spent on different outlets of the pool valve. This means that the user cannot choose to keep a specific water feature on, such as a fountain or a water slide, for an indefinite period of time if these features are controlled by the same pool valve. For this reason, many water features have a pump set aside just for that purpose. In addition, this lack of control means that, for a pool cleaning system, all of the cleaning heads must remain turned on for the same amount of time, even if that is not what is needed. For example, a specific area of the pool may need to be cleaned. With existing pool valves, the entire pool would have to be cleaned to use the installed cleaning system, instead of being able to focus on the specific area of the pool that requires cleaning. Thus, existing pool valves are inefficient, cause high pressure loss, and fail to give the user sufficient control over the pool systems.

SUMMARY

According to an aspect of the disclosure, a pool cycling valve system may comprise a first pool cycling valve having a first valve body with a first inlet port and a first plurality of outlet ports, wherein the first pool cycling valve is configured to move a first outlet port aperture to align with a first different outlet port of the first plurality of outlet ports in response to a change of water pressure within the first valve body, a first position sensor configured to determine a position of the first outlet port aperture, a first pausing arm configured to interfere with the movement of the first outlet port aperture when the first pausing arm is engaged, regardless of a change of water pressure within the first valve body, a first plurality of water zones each configured to fluidly couple with a respective outlet port of the first plurality of outlet ports, an interface configured to receive input from a user for a user-selected sequence for activating each water zone of the first plurality of water zones, a user-selected duration of activated time per water zone prior to activation of a subsequent water zone of the first plurality of water zones, and a number of water pressure cycles for a particular water zone to receive prior to the activation of the subsequent water zone, and a microcontroller communicatively coupled to the interface, wherein the interface is configured to communicate the input to the microcontroller and the microcontroller is configured to control the first pool cycling valve, the first outlet port aperture movement, and the first pausing arm to intelligently and selectively discharge water to each of the first plurality of water zones based on the input received from the interface.

Particular embodiments may comprise one or more of the following features. The pool cycling valve system may further comprise a second pool cycling valve configured to move a second outlet port aperture to align with a second different outlet port of a second plurality of outlet ports of the second pool cycling valve in response to a change of water pressure within a second valve body of the second pool cycling valve, a second position sensor configured to determine a position of the second outlet port aperture, a second pausing arm configured to interfere with the movement of the second outlet port aperture when the second pausing arm is engaged, regardless of a change of water pressure within the second valve body, and a second plurality of water zones each configured to fluidly couple with a respective outlet port of the second plurality of outlet ports, wherein a second inlet port of the second pool cycling valve is configured to receive water flow from a connected first outlet port of the first plurality of outlet ports, and wherein the microcontroller is further configured to control the second pool cycling valve, the second outlet port aperture movement, and the second pausing arm to intelligently and selectively discharge water to each of the second plurality of water zones based on the input received from the interface. At least one of the duration of activated time and the number of water pressure cycles may be different for each water zone of the first plurality of water zones. The change of water pressure within the valve body may be a reduction of at least 50%. The pool cycling valve system may further comprise a pump communicatively coupled to the microcontroller and configured to supply water to the first inlet port of the first pool cycling valve, wherein the microcontroller is configured to control the pump to supply water to the first pool cycling valve based on the input received from the interface and a plurality of pool cleaning heads, each water zone of the first plurality of water zones fluidly coupled to a portion of the plurality of pool cleaning heads.

According to an aspect of the disclosure, a pool cycling valve system may comprise at least one pool cycling valve having a valve body with an inlet port and a plurality of outlet ports, a plurality of water zones each configured to fluidly couple with a respective outlet port of the plurality of outlet ports, an interface configured to receive input from a user for at least one of a user-selected sequence for activating each water zone of the plurality of water zones, a user-selected duration of activated time per water zone prior to activation of a subsequent water zone of the plurality of water zones, and a number of water pressure cycles for a particular water zone to receive prior to the activation of the subsequent water zone, and a microcontroller communicatively coupled to the interface, wherein the interface is configured to communicate the input to the microcontroller and the microcontroller is configured to intelligently and selectively discharge water to each of the plurality of water zones based on the input received from the interface.

Particular embodiments may comprise one or more of the following features. The pool cycling valve may be configured to move an outlet port aperture to align with a different outlet port of the plurality of outlet ports in response to a change of water pressure within the valve body. The pool cycling valve system may further comprise a position sensor configured to determine a position of the outlet port aperture. The pool cycling valve system may further comprise a pausing arm configured to interfere with the movement of the outlet port aperture when the pausing arm is engaged, regardless of a change of water pressure within the valve body. The change of water pressure within the valve body may be a reduction of at least 50%. For each of the plurality of water zones, the duration of activated time and the number of water pressure cycles may be carried out without moving the outlet port aperture to align with a different outlet port of the plurality of outlet ports. At least one of the duration of activated time and the number of water pressure cycles may be different for each water zone of the plurality of water zones. The pool cycling valve system may further comprise a pump communicatively coupled to the microcontroller and configured to supply water to the inlet port of the at least one pool cycling valve, wherein the microcontroller is configured to control the pump to supply water to the at least one pool cycling valve based on the input received from the interface and a plurality of pool cleaning heads, each water zone of the plurality of water zones fluidly coupled to a portion of the plurality of pool cleaning heads.

According to an aspect of the disclosure, a method for operating a pool cycling valve system may comprise receiving input from a user at an interface for at least one of a user-selected sequence for activating each water zone of a plurality of water zones of the pool cycling valve system, a user-selected duration of activated time per water zone prior to activation of a subsequent water zone of the plurality of water zones, and a number of water pressure cycles for a particular water zone to receive prior to the activation of the subsequent water zone, communicating the input to a microcontroller of the pool cycling valve system configured to control at least one pool cycling valve of the pool cycling valve system having a valve body with an inlet port and a plurality of outlet ports, wherein each of the plurality of water zones is fluidly coupled with a respective outlet port of the plurality of outlet ports, and activating and deactivating the plurality of water zones by intelligently and selectively discharging water to each of the plurality of water zones based on the input received from the interface.

Particular embodiments may comprise one or more of the following features. The method of operating a pool cycling valve system may further comprise engaging a pausing arm of the pool cycling valve system while discharging water from the valve body. Activating the plurality of water zones may comprise receiving a stream of water into the valve body through the inlet port of the valve body and discharging the stream of water from the valve body through the outlet port corresponding to the activated zone. Activating a water zone of the plurality of water zones may comprise aligning an outlet port aperture of the pool cycling valve system with the outlet port corresponding to the activated zone. The method of operating a pool cycling valve system may further comprise determining a rotational position of an outlet port aperture of the pool cycling valve system. The input may specify a different duration of activated time for each water zone of the plurality of water zones. The input may specify a different number of water pressure cycles for each water zone of the plurality of water zones.

According to an aspect of the disclosure, a method for operating a pool cycling valve, may comprise receiving a stream of water into a valve body of a pool cycling valve through an inlet port, wherein a ratchet assembly is disposed within and rotatably coupled to the valve body, and the ratchet assembly is in a closed position configured to interfere with the stream of water flowing through the inlet port, rotating the ratchet assembly by a predetermined angle from the closed position to an open position, directing the stream of water to a bottom plate having an outlet port aperture extending through the bottom plate and aligned with an outlet port of a plurality of outlet ports of the valve body, discharging the stream of water from the valve body through the outlet port aperture and the outlet port, rotating the ratchet assembly from the open position to the closed position, and aligning the outlet port aperture with a different outlet port of the plurality of outlet ports in response to a combination of an increase and a decrease in water pressure within the valve body.

Particular embodiments may comprise one or more of the following features. Pausing the ratchet assembly in the open position by extending a pausing arm into the interior of the valve body to engage with the ratchet assembly and restrict its movement. Sensing a rotational position of the bottom plate. Rotating the ratchet assembly by a predetermined angle from the closed position to the open position may further comprise rotating the ratchet assembly as a result of exerting pressure on the ratchet assembly with the stream of water. Rotating the ratchet assembly from the open position to the closed position may further comprise rotating the ratchet assembly as a result of decreasing the pressure on the ratchet assembly.

According to an aspect of the disclosure, a method for operating a pool cycling valve may comprise aligning an outlet port aperture extending through a bottom plate of the pool cycling valve with a first outlet port of a plurality of outlet ports of a valve body of the pool cycling valve, receiving a first stream of water into the valve body through an inlet port, directing the first stream of water to the outlet port aperture, discharging the first stream of water from the valve body through the outlet port aperture and through the first outlet port, increasing water pressure within the valve body, decreasing the water pressure within the valve body, aligning the outlet port aperture with a second outlet port of the plurality of outlet ports in response to a first combination of the increasing and decreasing water pressure, receiving a second stream of water into the valve body through the inlet port, directing the second stream of water to the outlet port aperture, discharging the second stream of water from the valve body through the outlet port aperture and through the second outlet port, increasing the water pressure within the valve body after discharging the second stream of water, decreasing the water pressure within the valve body after discharging the second stream of water, and aligning the outlet port aperture with a third outlet port of the plurality of outlet ports response to a second combination of the increasing and decreasing water pressure.

Particular embodiments may comprise one or more of the following features. Aligning the outlet port aperture with the first outlet port may be in response to a change of water pressure within the valve body. The change of water pressure may be a reduction of water pressure within the valve body. The reduction of water pressure within the valve body may be a reduction of at least 50%. Holding the bottom plate stationary while increasing the water pressure within the valve body, receiving a stream of water into the valve body through the inlet port, directing the stream of water to the outlet port aperture, discharging the stream of water from the valve body through the outlet port aperture, and decreasing the water pressure within the valve body. Sensing a rotational position of the bottom plate. Aligning the outlet port aperture with the second outlet port and aligning the outlet port aperture with the third outlet port may be each taken immediately after decreasing the water pressure within the valve body.

According to an aspect of the disclosure, a method for operating a pool cycling valve may comprise aligning an outlet port aperture extending through a bottom plate with a first outlet port of a plurality of outlet ports of a valve body, receiving a first stream of water into the valve body through an inlet port, discharging the first stream of water from the valve body through the outlet port aperture and through the first outlet port, and aligning the outlet port aperture with a second outlet port of the plurality of outlet ports in response to a combination of a negative and a positive change in water pressure within the valve body.

Particular embodiments may comprise one or more of the following features. Aligning the outlet port aperture with the second outlet port may be taken after the negative change in the water pressure within the valve body. The positive change in the water pressure may occur after the negative change in the water pressure for the combination. Aligning the outlet port aperture with the first outlet port may be in response to a change of water pressure within the valve body. The change of water pressure may be a reduction of water pressure within the valve body. The negative change in the water pressure within the valve body may be a reduction in water pressure by at least 50%. Holding the bottom plate stationary while increasing the water pressure within the valve body, receiving a stream of water into the valve body through the inlet port, discharging the stream of water from the valve body through the outlet port aperture, and decreasing the water pressure within the valve body. Sensing a rotational position of the bottom plate.

According to an aspect of the disclosure, a pool cycling valve may comprise a valve body having at least one inlet port and a plurality of outlet ports, a ratchet assembly disposed within and rotatably coupled to the valve body, the ratchet assembly comprising an upper arm with a leading surface and at least one ratchet arm extending away from a perimeter of the ratchet assembly, an upper plate above the ratchet assembly within the valve body and rotationally fixed with respect to the valve body, the upper plate having a channel configured to receive a stream of water from the at least one inlet port and direct the stream of water toward a channel drain of the upper plate, wherein when the ratchet assembly is in a closed position, the upper arm extends into the channel and is configured to restrict water flow into the channel drain and when the ratchet assembly is in a open position, the upper arm is retracted within the channel to open the channel drain, and a bottom plate beneath the ratchet assembly within the valve body, the bottom plate having an outlet port aperture extending through the bottom plate and aligned with one of the plurality of outlet ports, and at least one ratchet tooth operably aligned with the at least one ratchet arm, wherein when the ratchet assembly rotates from the closed position to the open position, the at least one ratchet arm flexes and rotates without rotating the bottom plate, and when the ratchet assembly rotates from the open position to the closed position, the at least one ratchet arm engages with the at least one ratchet tooth and rotates the bottom plate to align the outlet port aperture with a different one of the plurality of outlet ports, wherein the ratchet assembly is rotationally biased toward the closed position and wherein the ratchet assembly rotates from the closed position to the open position in response to pressure exerted on the leading surface of the upper arm by the stream of water.

Particular embodiments may comprise one or more of the following features. A cartridge body may be disposed within and fixedly coupled to the valve body, wherein the bottom plate rests on top of the cartridge body, the cartridge body having a plurality of ramps arranged around a center of the cartridge body, wherein when the bottom plate is lifted by the plurality of ramps, the outlet port aperture is offset from each of the plurality of outlet ports and when the bottom plate is positioned off of the plurality of ramps, the outlet port aperture is aligned with one of the plurality of outlet ports. At least one pushdown arm may be fixedly coupled to the valve body, the at least one pushdown arm in contact with the bottom plate and configured to bias the bottom plate toward a position in which the outlet port aperture is aligned with an outlet port of the plurality of outlet ports. A pausing arm may extend through a side wall of the valve body, wherein, when engaged, the pausing arm protrudes into the interior of the valve body and locks the ratchet assembly in the open position. A position sensor may be located on a side wall of the valve body and a magnet fixedly coupled to the bottom plate, wherein the position sensor is configured to sense the magnet when the magnet is adjacent the position sensor.

According to an aspect of the disclosure, a pool cycling valve may comprise a valve body having at least one inlet port and a plurality of outlet ports, a ratchet assembly disposed within and rotationally coupled to the valve body, a bottom plate disposed within and rotationally coupled to the valve body, the bottom plate having an outlet port aperture extending through the bottom plate and aligned with an outlet port of the plurality of outlet ports, and an interface between the ratchet assembly and the bottom plate, the interface having at least one ratchet arm extending into the interface and at least one ratchet tooth operably aligned with the at least one ratchet arm, wherein one of the at least one ratchet arm and the at least one ratchet tooth is fixedly coupled to the ratchet assembly and the other of the least one ratchet arm and the at least one ratchet tooth is fixedly coupled to the bottom plate, wherein when the ratchet assembly rotates in a first direction, the bottom plate remains in place, and when the ratchet assembly rotates in a second direction opposite the first direction, the at least one ratchet arm engages with the at least one ratchet tooth and aligns the outlet port aperture with a different outlet port of the plurality of outlet ports, and wherein the ratchet assembly rotates in one of the first direction and the second direction in response to pressure exerted on the ratchet assembly by a stream of water.

Particular embodiments may comprise one or more of the following features. The ratchet assembly may be rotationally biased to rotate in one of the first direction and the second direction. A cartridge body may be disposed within and fixedly coupled to the valve body, wherein the bottom plate rests on top of the cartridge body, the cartridge body having a plurality of ramps arranged around a center of the cartridge body, wherein when the bottom plate is lifted by the plurality of ramps, the outlet port aperture is offset from each of the plurality of outlet ports and when the bottom plate is positioned off of the plurality of ramps, the outlet port aperture is aligned with one of the plurality of outlet ports. At least one pushdown arm may be fixedly coupled to the valve body, the at least one pushdown arm in contact with the bottom plate and configured to bias the bottom plate toward a position in which the outlet port aperture is aligned with an outlet port of the plurality of outlet ports. A pausing arm may extend through a side wall of the valve body, wherein, when engaged, the pausing arm protrudes into the interior of the valve body and locks the ratchet assembly in position. A position sensor may be located on a side wall of the valve body and a magnet fixedly coupled to the bottom plate, wherein the position sensor is configured to sense the magnet when the magnet is adjacent the position sensor.

According to an aspect of the disclosure, a pool cycling valve may comprise a valve body having at least one inlet port and a plurality of outlet ports, and a bottom plate disposed within and rotationally coupled to the valve body, the bottom plate having an outlet port aperture extending through the bottom plate and aligned with an outlet port of the plurality of outlet ports, wherein the outlet port aperture of the bottom plate is configured to align with a different outlet port of the plurality of outlet ports in response to a change of water pressure within the valve body.

Particular embodiments may comprise one or more of the following features. The change of water pressure may be a reduction of water pressure within the valve body. The reduction of water pressure within the valve body may be a reduction of at least 50%. The outlet port aperture may be configured to sequentially align with each of the plurality of outlet ports, and each alignment of the outlet port aperture with each of the plurality of outlet ports occurs after both a rise in water pressure within the valve body and a reduction in water pressure within the valve body. The outlet port aperture may be configured to rotate by discrete intervals, and at each interval, the outlet port aperture is aligned with a different outlet port of the plurality of outlet ports. The outlet port aperture may have a first position aligned with a first outlet port of the plurality of outlet ports, a second position aligned with a second outlet port of the plurality of outlet ports, and a third position aligned with a third outlet port of the plurality of outlet ports, wherein the outlet port aperture only moves from the first position to the second position after both a rise in water pressure within the valve body and a reduction in water pressure within the valve body, and wherein the outlet port aperture only moves from the second position to the third position after both a rise in water pressure within the valve body and a reduction in water pressure within the valve body. A position sensor may be configured to sense the rotational position of the bottom plate. A pausing arm may be configured to restrict rotation of the bottom plate such that the bottom plate is rotationally stationary regardless of a change of water pressure within the valve body. A ratchet assembly may be disposed within and rotationally coupled to the valve body, wherein when the ratchet assembly rotates in a first direction, the bottom plate remains in place, and when the ratchet assembly rotates in a second direction opposite the first direction, the ratchet assembly rotates the bottom plate to align the outlet port aperture with the different outlet port of the plurality of outlet ports.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that he can be his own lexicographer if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

Figure 1:
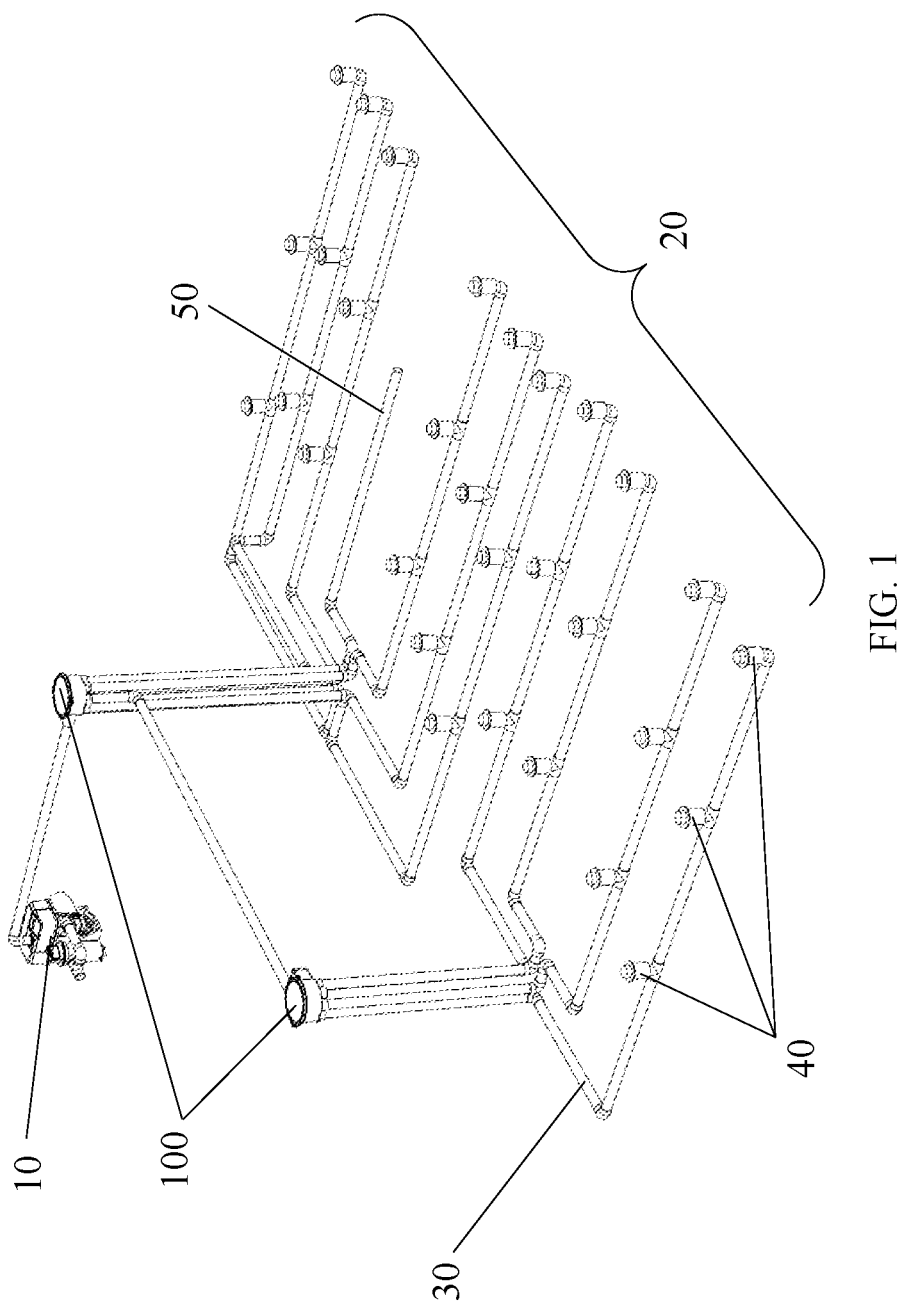
FIG. 1 is a perspective view of a pool cycling valve shown in a typical environment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of implementations that are described in many different forms, there is shown in the drawings and will herein be described in detail particular implementations with the understanding that the present disclosure is to be considered as an exemplification of the principles of the disclosed methods and systems, and is not intended to limit the broad aspect of the disclosed concepts to the implementations illustrated.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

As illustrated in FIG. 1, the pool cycling valve 100 is designed to supply water to the systems of a pool that require water flow. The pool cycling valve 100 is in fluid communication with a pump 10, which supplies water to the pool cycling valve 100. The pool cycling valve 100 in turn supplies the water to the systems which require water flow, such as a water feature or a pool cleaning system. FIG. 1 illustrates that the pool cycling valve 100 may supply water to multiple zones of a cleaning system 20, where the pool cycling valve alternates supplying water to different zones. When water is supplied to a particular zone, such as zone 30, the individual heads 40 connected to the pipe which corresponds to zone 30 discharge water into the pool and clean that zone of the pool. The same embodiment of the pool cycling valve 100 may also supply water to a water feature through a separate pipe 50.

For pools with a higher number of water-flow-dependent systems, additional pool cycling valves 100 may be fluidly coupled and operated using one pump 10, as illustrated in FIG. 1. As will be described in more detail below, the pool cycling valve 100 is capable of pausing and holding a position indefinitely, allowing the subsequent pool cycling valve 100 to cycle through any number of water features before the first pool cycling valve 100 resumes its operation.

Figure 2:
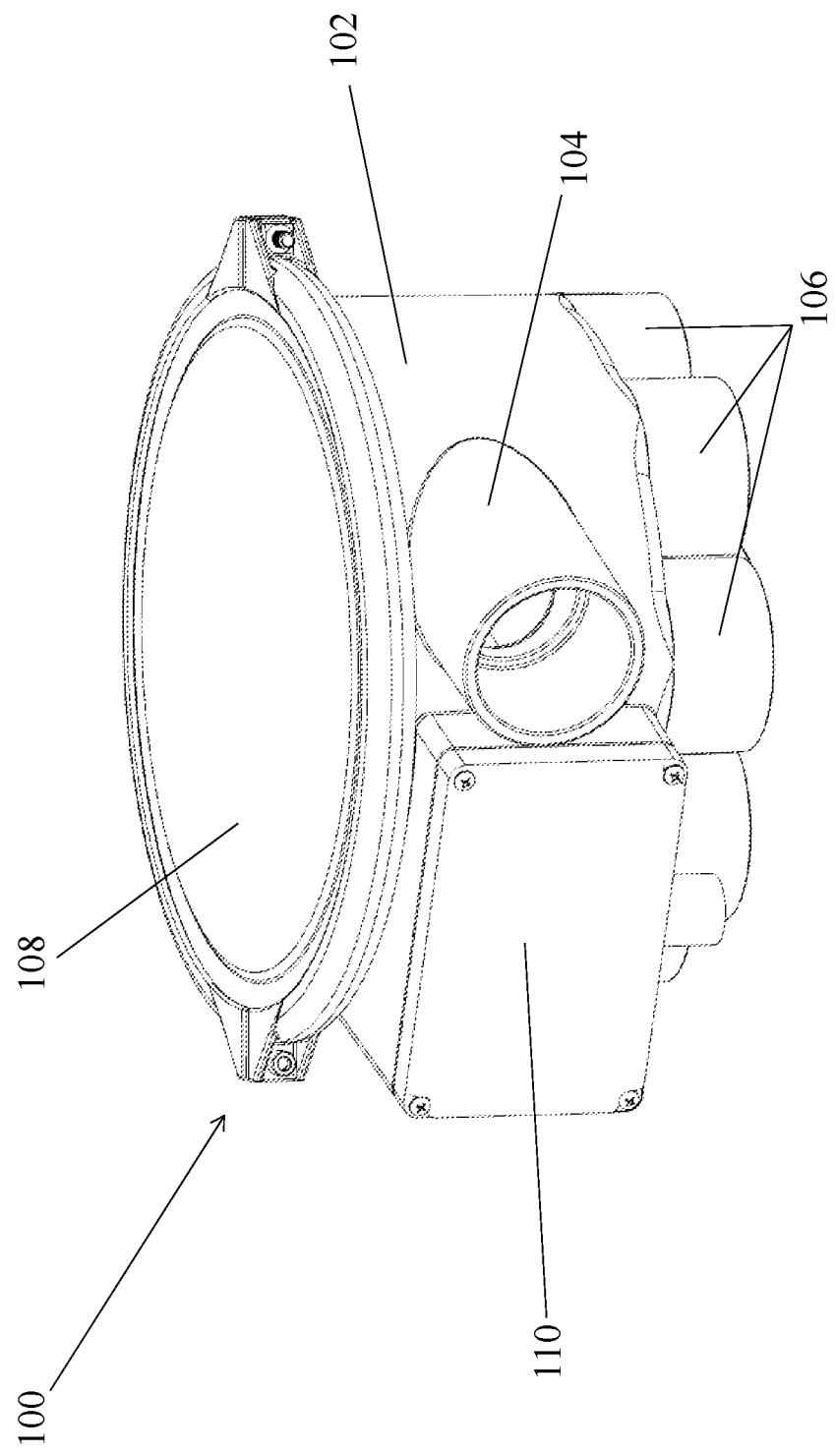
FIG. 2 is a perspective view of an embodiment of the pool cycling valve.
Figure 3:
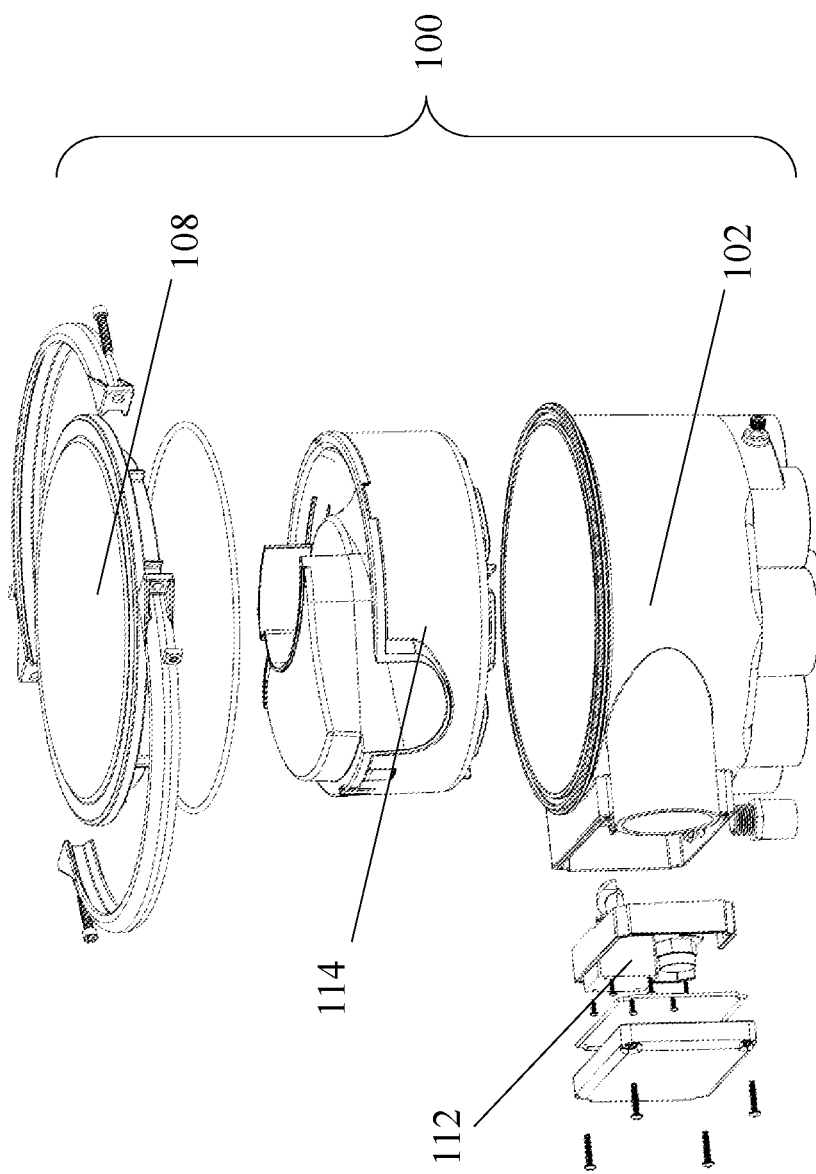
FIG. 3 is an exploded view of the pool cycling valve shown in FIG. 2.
Figure 4:
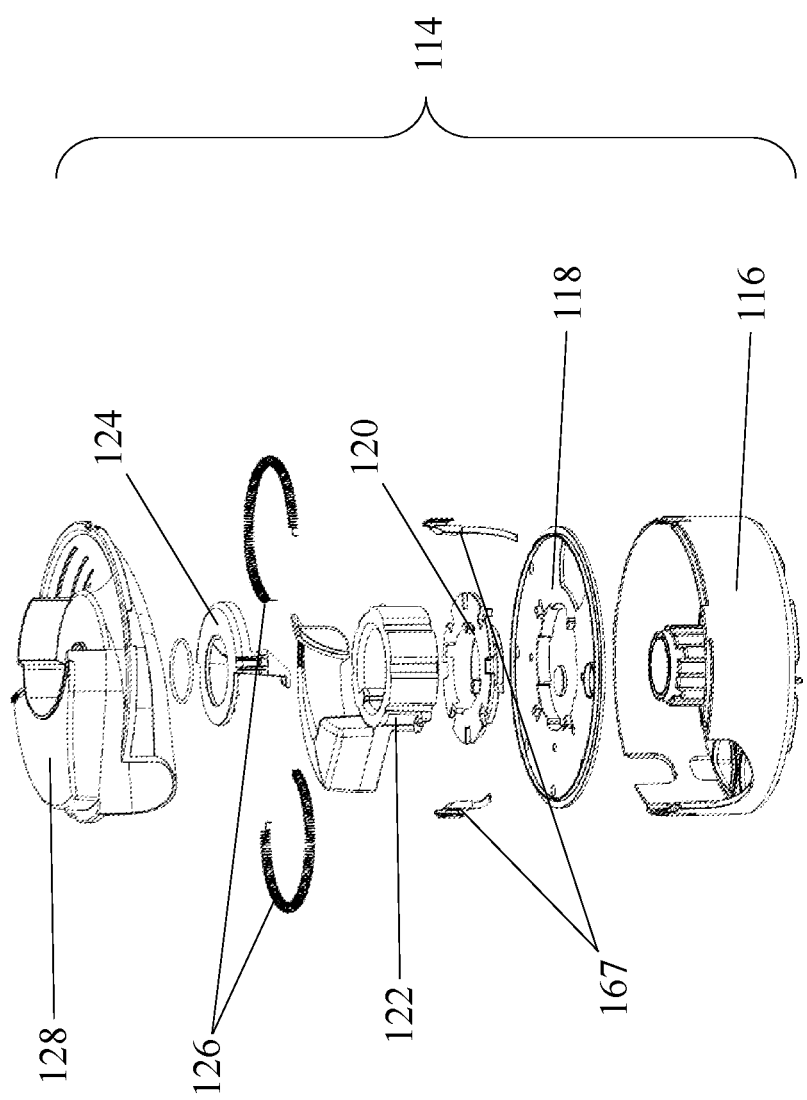
FIG. 4 is an exploded view of the cartridge subassembly from FIG. 3.

As shown in FIG. 2, the pool cycling valve 100 has a valve body 102 with at least one inlet port 104 and a plurality of outlet ports 106. In addition, the pool cycling valve 100 may have a lid 108 and an electronics box 110 extending away from the valve body 102. The electronics box 110 is sized to fit the electronics subassembly 112 therein, as shown in FIG. 3. Also shown in FIG. 3, a cartridge subassembly 114 sits inside of the valve body 102. FIG. 4 illustrates an exploded view of the cartridge subassembly 114. The cartridge subassembly 114 may comprise a cartridge body 116, a bottom plate 118, a ratchet body 120, a cup 122, a spring lock 124, a spring 126, pushdown arms 167, and an upper plate 128. FIGS. 5A-5I illustrate how these different components function together.

Figure 5A:
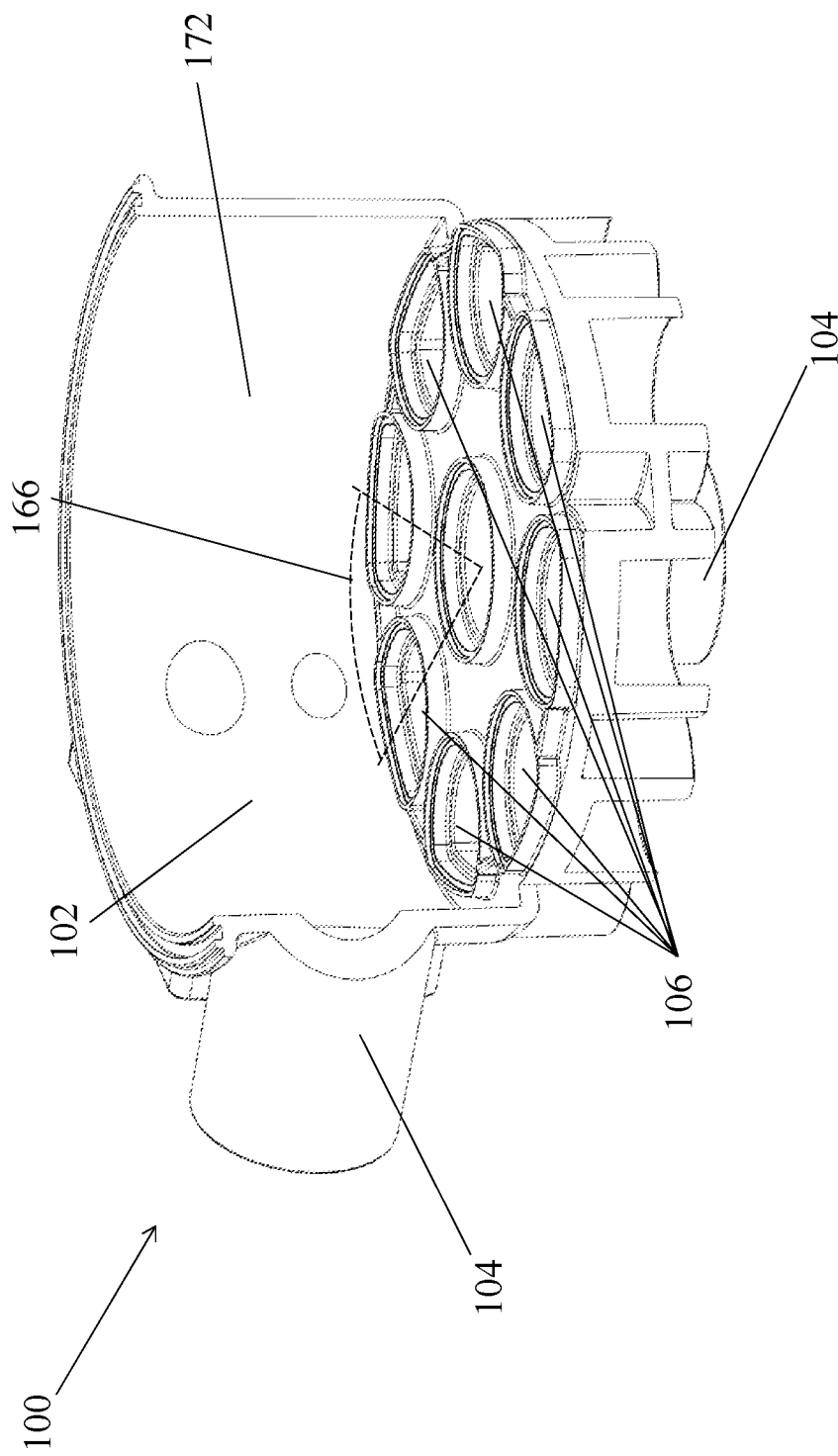
FIG. 5A is a perspective view of the pool cycling valve shown in FIG. 2 with the side wall removed to expose the interior without any other components.
Figure 5B:
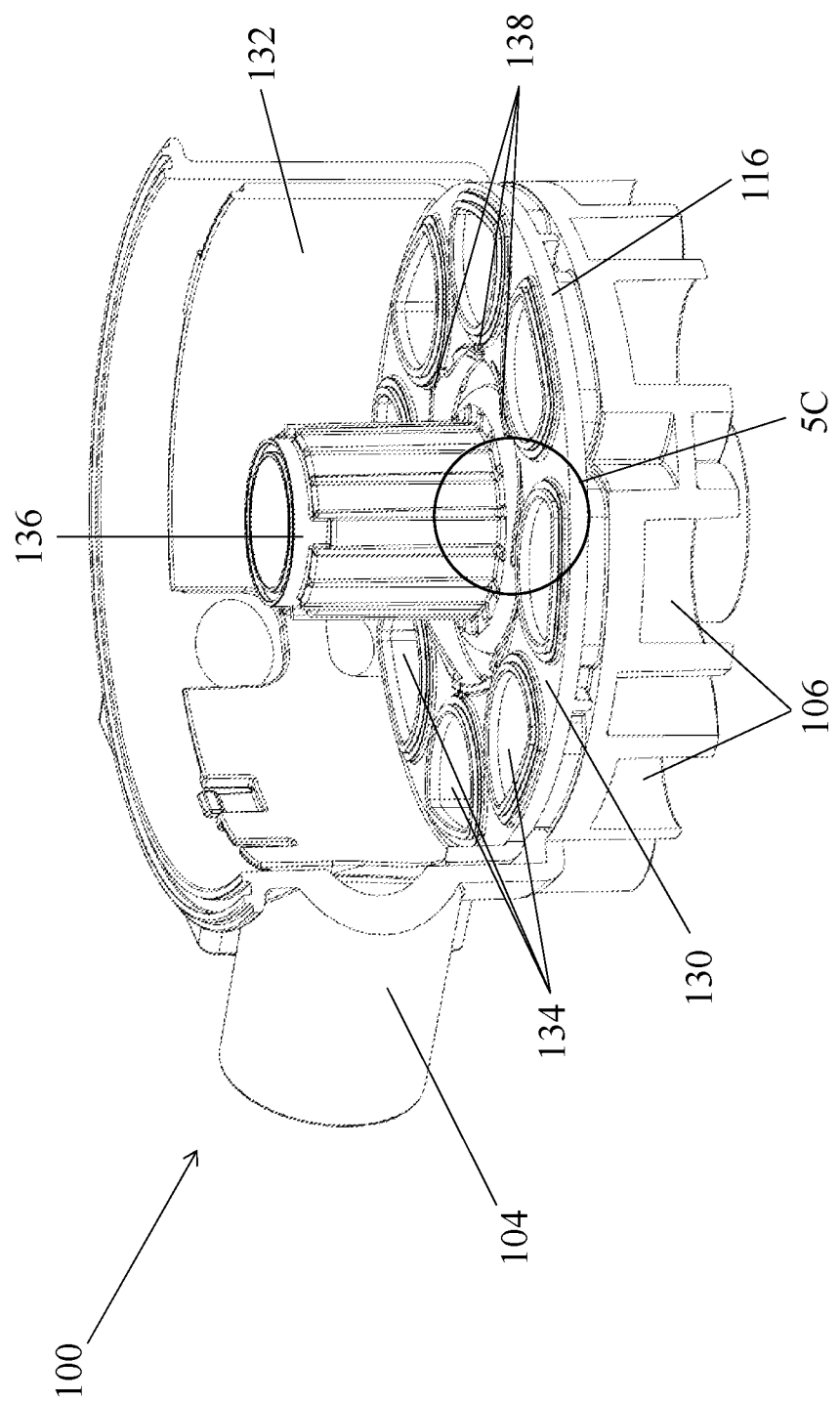
FIG. 5B is a perspective view of the pool cycling valve shown in FIG. 2 with the side wall removed to expose the interior, showing the cartridge body.
Figure 5C:
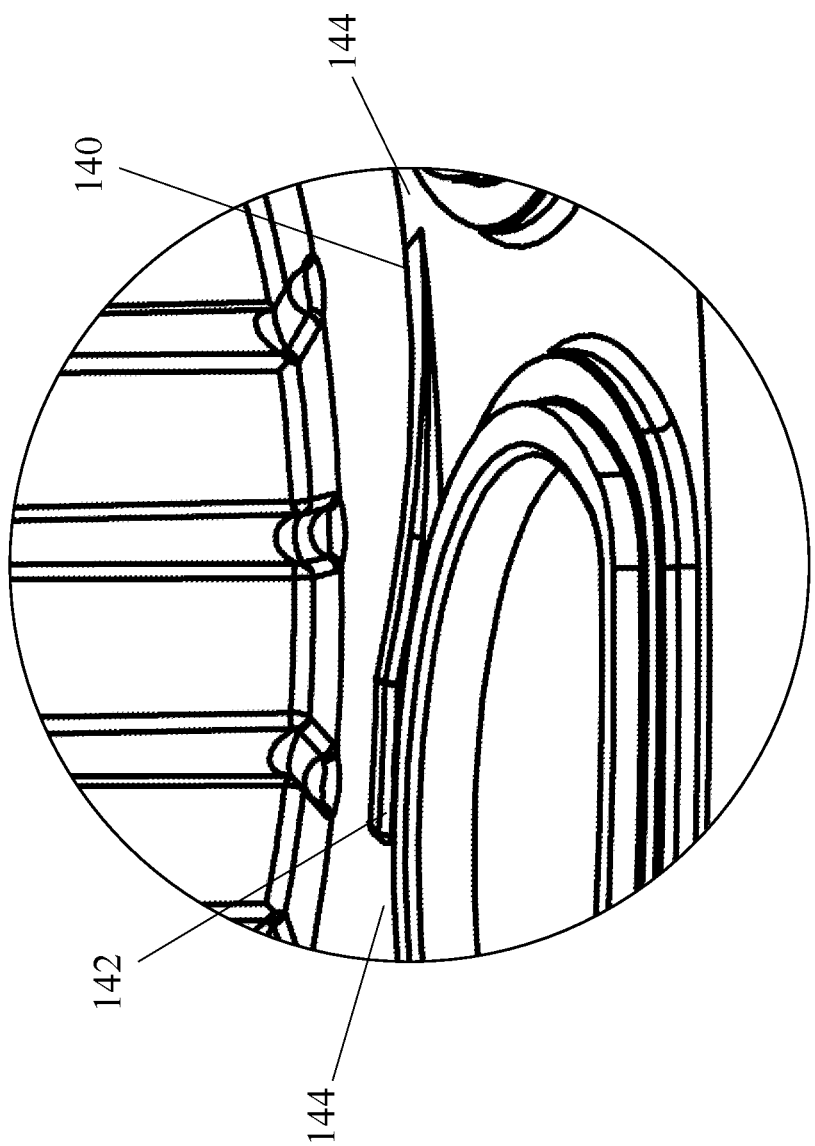
FIG. 5C is a close up view of a ramp taken from circle 5C in FIG. 5B.

FIG. 5A shows the interior of the valve body 102 without any other components. At least one inlet port 104 and the plurality of outlet ports 106 are shown. FIG. 5B shows the cartridge body 116 disposed within the valve body 102. The cartridge body 116 is fixedly coupled to the valve body 102 and is shaped like a cup with a bottom surface 130 and a side wall 132. The cartridge body 116 has a plurality of holes 134 extending through the bottom surface 130. Each of the plurality of holes 134 is aligned with each of the outlet ports 106. In addition, the cartridge body 116 has a central column 136. The central column 136 is configured to provide structure for the remaining components of the cartridge subassembly 114 as well as a water passage from the at least one inlet port 104. A plurality of ramps 138 may surround the central column 136 on the cartridge body 116. Each of the ramps 138 has a base 140 and a peak 142, as illustrated in FIG. 5C, a close-up view of one of the ramps 138. The plurality of ramps 138 may be positioned and sized such that the peak 142 of each ramp 138 is adjacent the base 140 of an adjacent ramp 138 and a trough 144 created by the base 140 and the peak 142 of each ramp 138 is radially aligned with an outlet port 106 of the plurality of outlet ports 106. For any object which moves along the plurality of ramps 138, if the pool cycling valve 100 is oriented with the central column 136 vertical, having the peak 142 of each ramp 138 adjacent the base 140 of an adjacent ramp 138 creates a bias towards a position aligned with an outlet port 106 of the plurality of outlet ports 106 because gravity biases the object to sit in the trough 144 created by the base 140 and the peak 142 of the ramp 138. This bias may be amplified by applying an additional force in the direction of the axis of the central column 136. In addition, even if the pool cycling valve 100 is not oriented with the central column 136 vertical, the bias towards sitting in the trough 144 can be created by applying a force in the direction of the axis of the central column 136. In some embodiments, the cartridge subassembly 114 does not have a cartridge body 116. In such a case, all or some of the components of the cartridge body 116, such as the central column 136 and the plurality of ramps 138, may be integral with the valve body 102. In addition, the cartridge body 116 itself may be integral with the valve body 102.

Figure 5D:
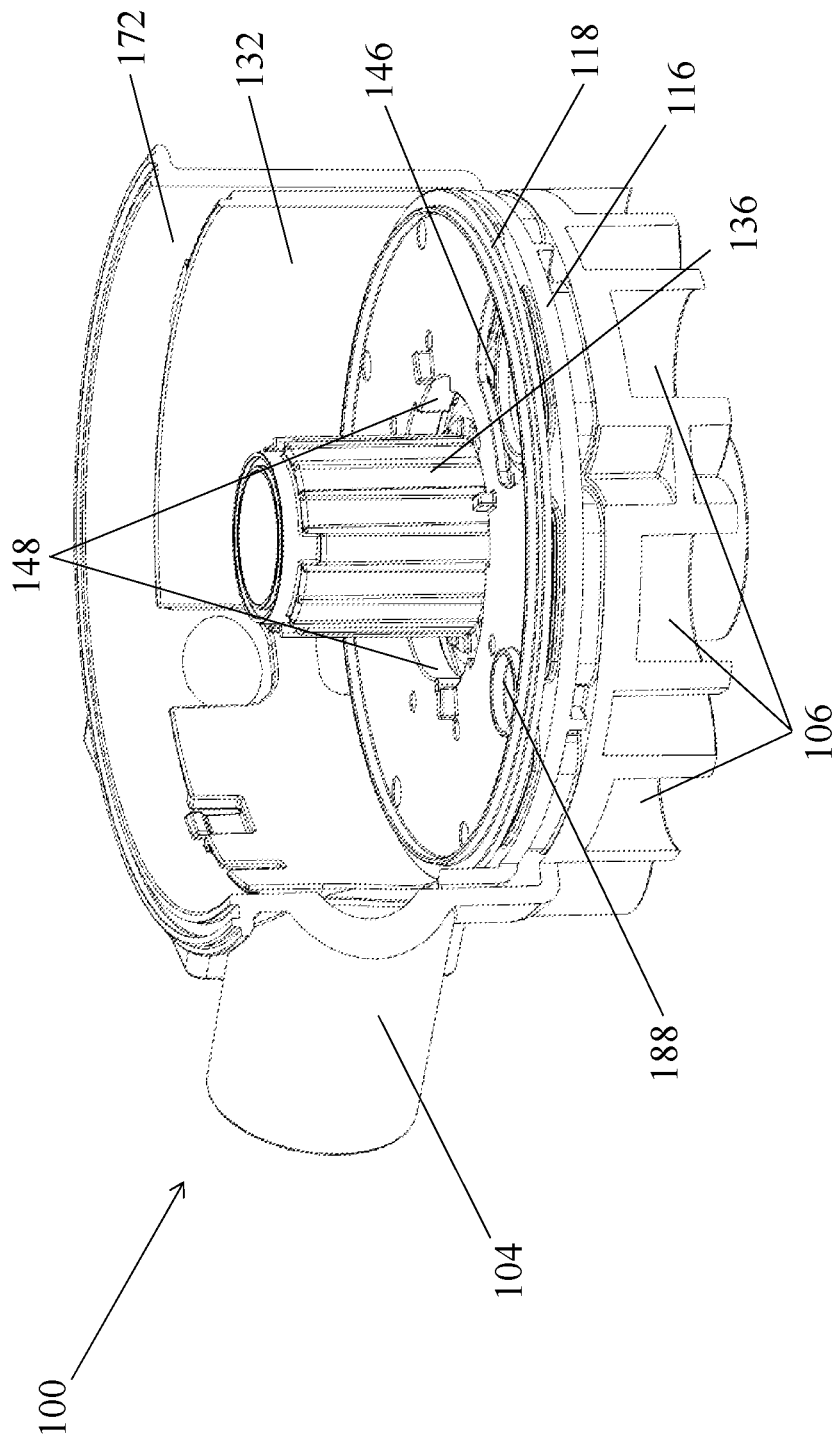
FIG. 5D is a perspective view of the pool cycling valve shown in FIG. 2 with the side wall removed to expose the interior, showing the bottom plate.
Figure 5E:
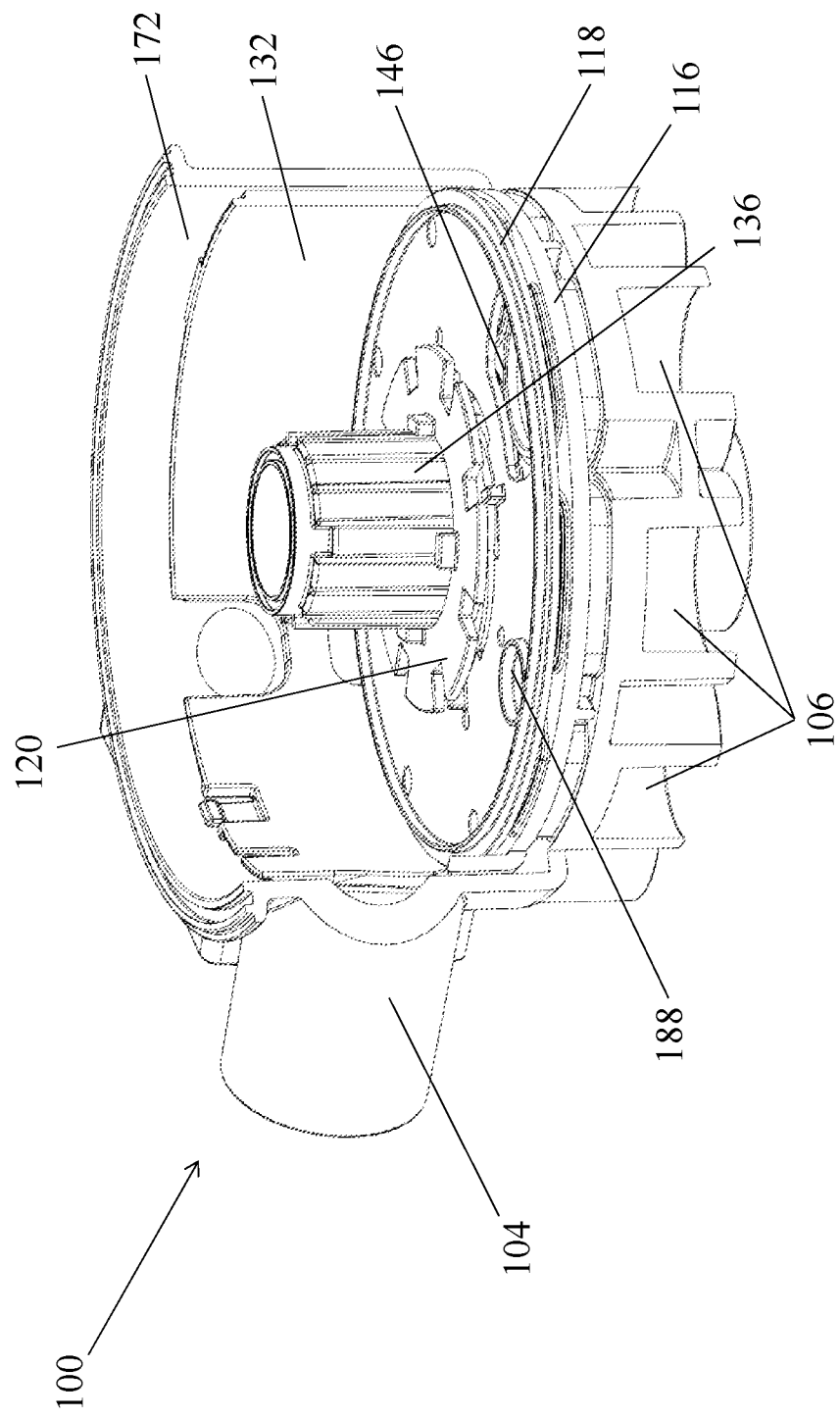
FIG. 5E is a perspective view of the pool cycling valve shown in FIG. 2 with the side wall removed to expose the interior, showing the ratchet body.

FIGS. 5D and 5E illustrate the bottom plate 118 above the cartridge body 116 within the valve body 102 and the ratchet body 120 disposed within and rotatably coupled to the valve body 102, respectively. The bottom plate 118 has an outlet port aperture 146 extending through the bottom plate 118. The outlet port aperture 146 is configured to sequentially align with each of the plurality of outlet ports 106 as the bottom plate 118 rotates. The rotation of the bottom plate 118 and thus the alignment of the outlet port aperture 146 with each of the plurality of outlet ports 106 may occur in response to a change of water pressure with the valve body 102. The change of water pressure may be an increase of water pressure within the valve body 102, such as when water flow through the pool cycling valve 100 is first started. Alternatively, the change of water pressure may be a reduction of water pressure. The bottom plate 118 may only rotate to align the outlet port aperture 146 with a different outlet port 106 when the water pressure is reduced within the valve body 102 by at least 25%, at least 40%, at least 45%, at least 50%, at least 55%, at least 60%, or at least 75%. In some embodiments, the outlet port aperture 146 is configured to sequentially align with each of the plurality of outlet ports 106 in response to a combination of a rise in water pressure within the valve body 102 and a reduction in water pressure within the valve body 102. In such an embodiment, each alignment of the outlet port aperture 146 with each of the plurality of outlet ports 106 occurs after both a rise in water pressure within the valve body 102 and a reduction in water pressure within the valve body 102. This allows the change in position of the outlet port aperture 146 to occur during low water pressure, leading to a reduction in the head loss that is common to pool valves. In particular embodiments, the outlet port aperture 146 has a first position aligned with a first outlet port 106 of the plurality of outlet ports 106, a second position aligned with a second outlet port 106 of the plurality of outlet ports 106, and a third position aligned with a third outlet port 106 of the plurality of outlet ports 106. The outlet port aperture 146 only moves from the first position to the second position after both after both a rise in water pressure within the valve body 102 and a reduction in water pressure within the valve body 102. In addition, the outlet port aperture 146 only moves from the second position to the third position after both a rise in water pressure within the valve body and a reduction in water pressure within the valve body. The outlet port aperture 146 may be configured to rotate by discrete intervals, such as by the first angle 166 (see FIG. 5A). At each interval, the outlet port aperture 146 is aligned with a different outlet port 106 of the plurality of outlet ports 106.

Figure 6:
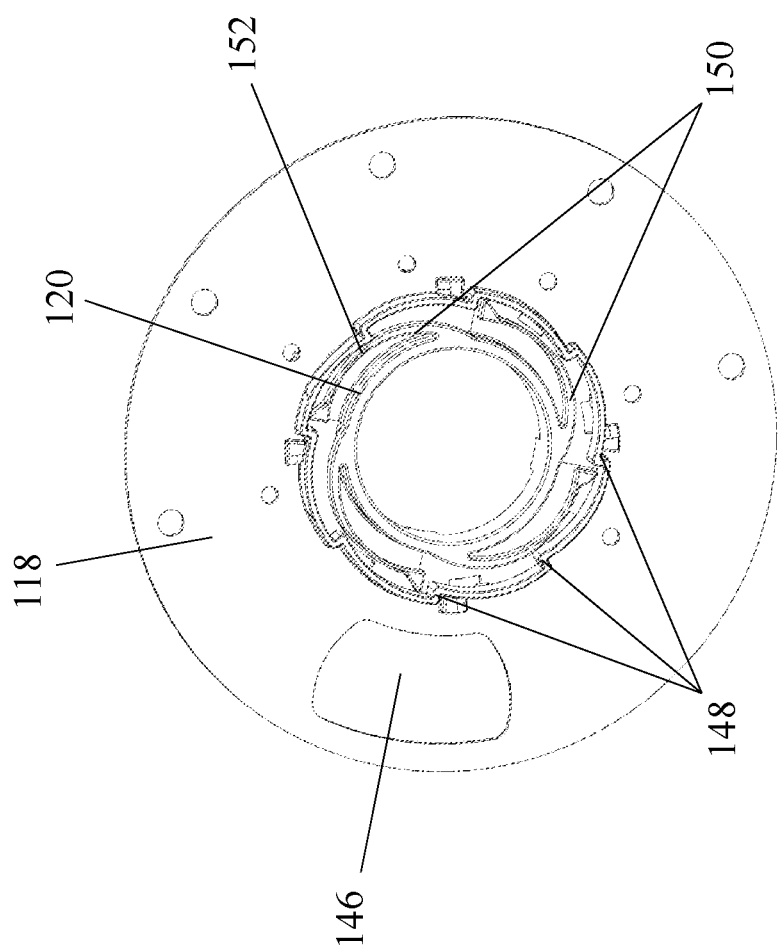
FIG. 6 is a bottom view of the bottom plate and ratchet assembly of the pool cycling valve shown in FIG. 2, illustrating the interface with the ratchet arms and ratchet teeth.

The ratchet body 120 may have at least one ratchet arm 150 extending away from a perimeter of the ratchet body 120 (see FIG. 6) and the bottom plate 118 may also have at least one ratchet tooth 148 operably aligned with the at least one ratchet arm 150. The at least one ratchet tooth 148 and the at least one ratchet arm 150 together form an interface 152 between the ratchet body 120 and the bottom plate 118. The at least one ratchet arm 150 extends into the interface 152. While the embodiment shown in the figures has the at least one ratchet tooth 148 fixedly coupled to the bottom plate 118 and the at least one ratchet arm 150 fixedly coupled to the ratchet body 120, it is an equivalent for the at least one ratchet arm 150 to be fixedly coupled to the bottom plate 118 and the at least one ratchet tooth 148 to be fixedly coupled to the ratchet body 120. In addition, it is an equivalent to flip the orientation of the at least one ratchet tooth 148 and the at least one ratchet arm 150 so that the bottom plate 118 rotates in the opposite direction. This equivalent will be discussed in further detail below. The number of ratchet teeth 148 may be equal to the number of ratchet arms 150. Alternatively, the numbers may not be equal. There may be as few as one ratchet tooth 148, and there may be as few as one ratchet arm 150. In a particular embodiment, there are four ratchet arms 150 and eight ratchet teeth 148 (see FIG. 6). The ratchet teeth 148 and the ratchet arms 150 may be spaced evenly around the interface 152, but this is not necessary. In some embodiments, the ratchet teeth 148 and the ratchet arms 150 may be spaced at irregular intervals (not shown).

Figure 5F:
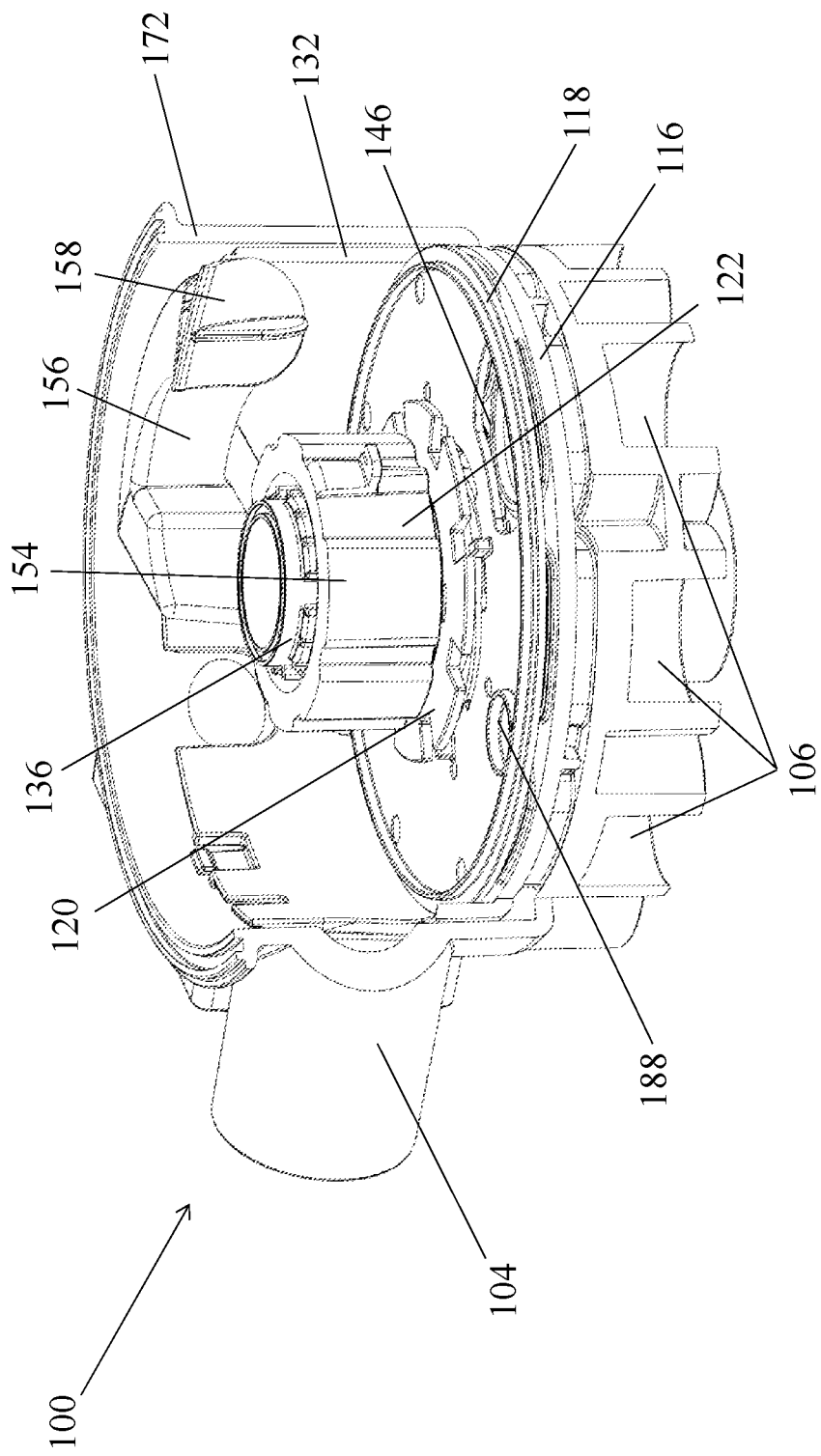
FIG. 5F is a perspective view of the pool cycling valve shown in FIG. 2 with the side wall removed to expose the interior, showing the cup and upper arm.
Figure 9A:
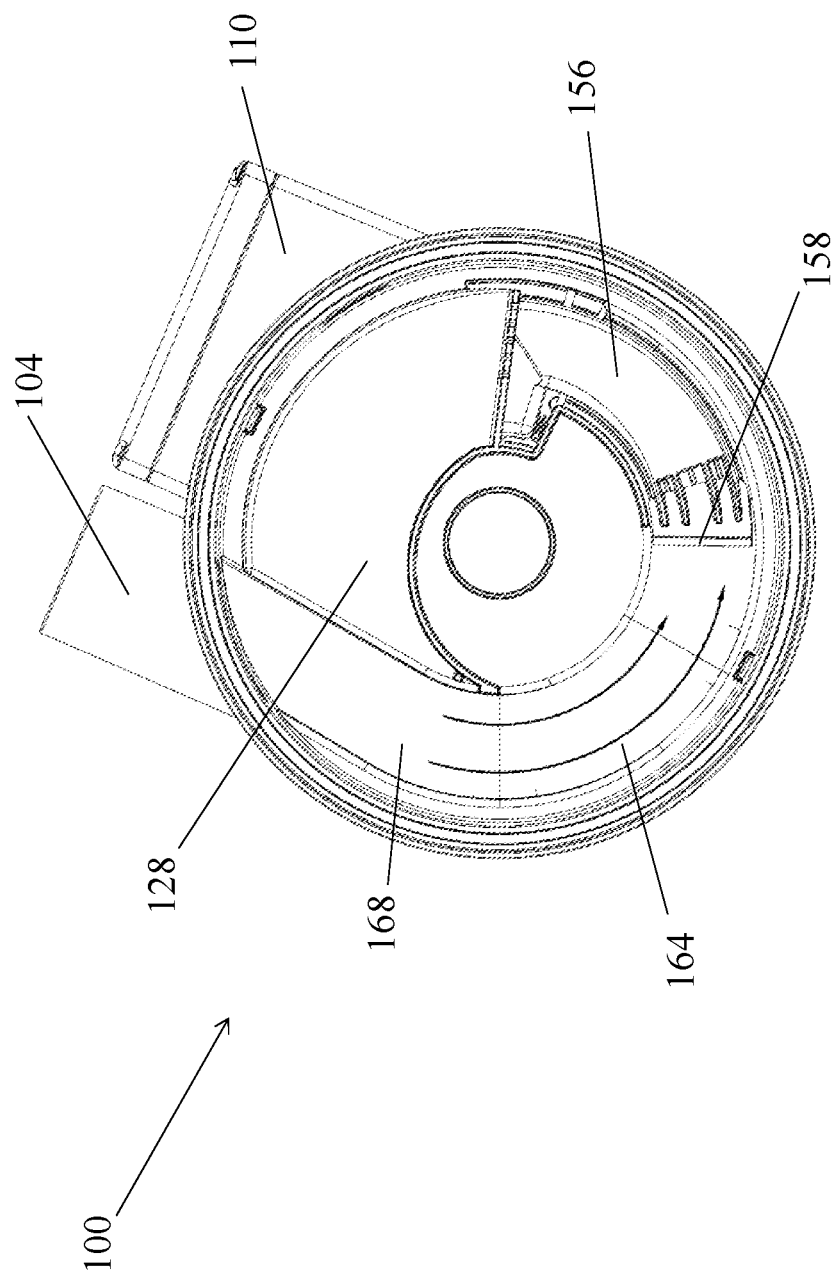
FIG. 9A is a top view of the pool cycling valve shown in FIG. 2, with the lid removed and the upper arm in the closed position.
Figure 9B:
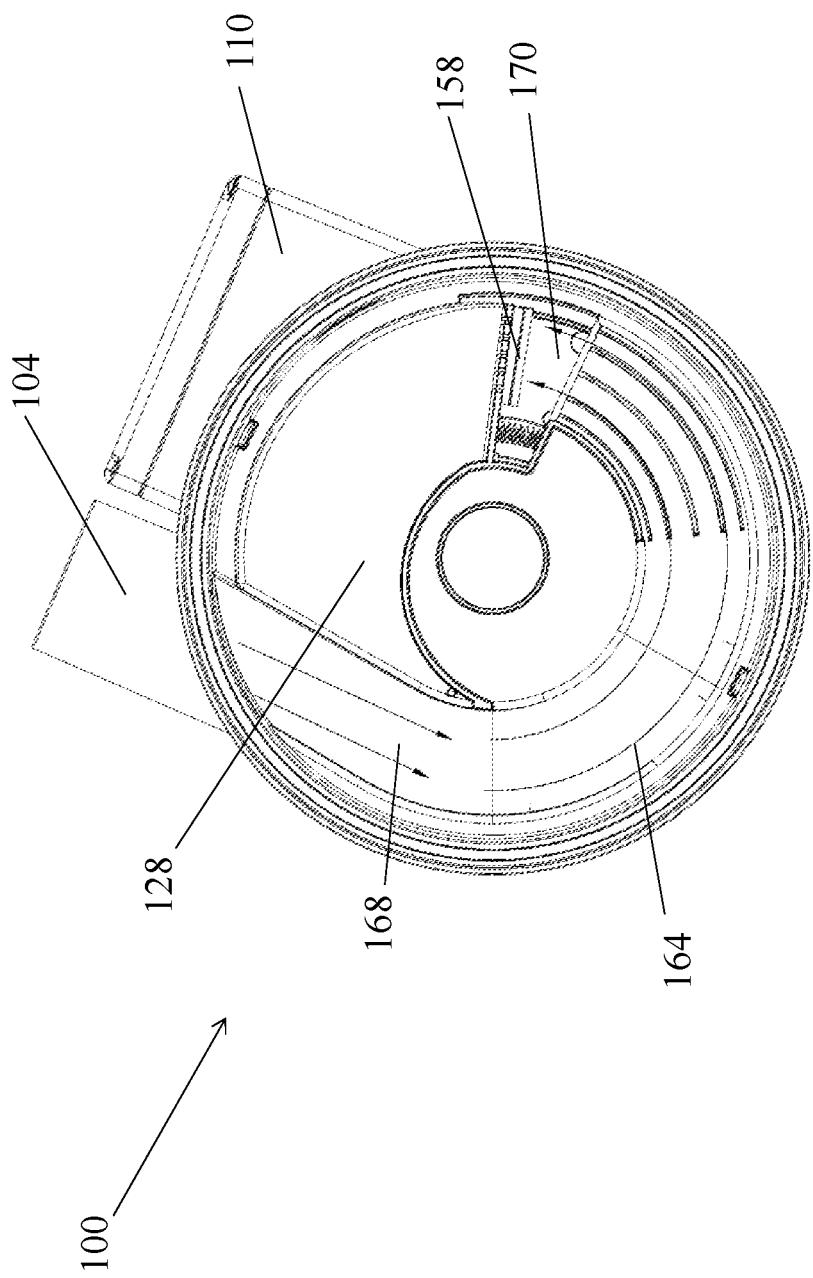
FIG. 9B is a top view of the pool cycling valve shown in FIG. 2, with the lid removed and the upper arm in the open position.

FIG. 5F illustrates the cup 122 rotationally coupled to the ratchet body 120. A ratchet assembly 154 comprises the cup 122 and the ratchet body 120, and may be formed of two separate components or may be one piece. Extending upward and away from the ratchet assembly 154 may be an upper arm 156 with a leading surface 158. The ratchet assembly 154 is configured to rotate between a closed position (FIG. 9A) and a open position (FIG. 9B). When in the closed position (FIG. 9A), the ratchet assembly 154 is configured to interfere with a stream of water 164 flowing into the valve body 102 through the at least one inlet port 104. When in the open position (FIG. 9B), the ratchet assembly 154 is rotated by a predetermined angle 166 about the axis of the central column 136 from the position of the ratchet assembly 154 in the closed position (FIG. 9A). The predetermined angle 166 may be the angle between two lines extending from the axis of rotation of the ratchet assembly 154, with one of the two lines extending to the center of an outlet port 106 and the other of the two lines extending to the center of an adjacent outlet port 106 (see FIG. 5A).

Figure 5G:
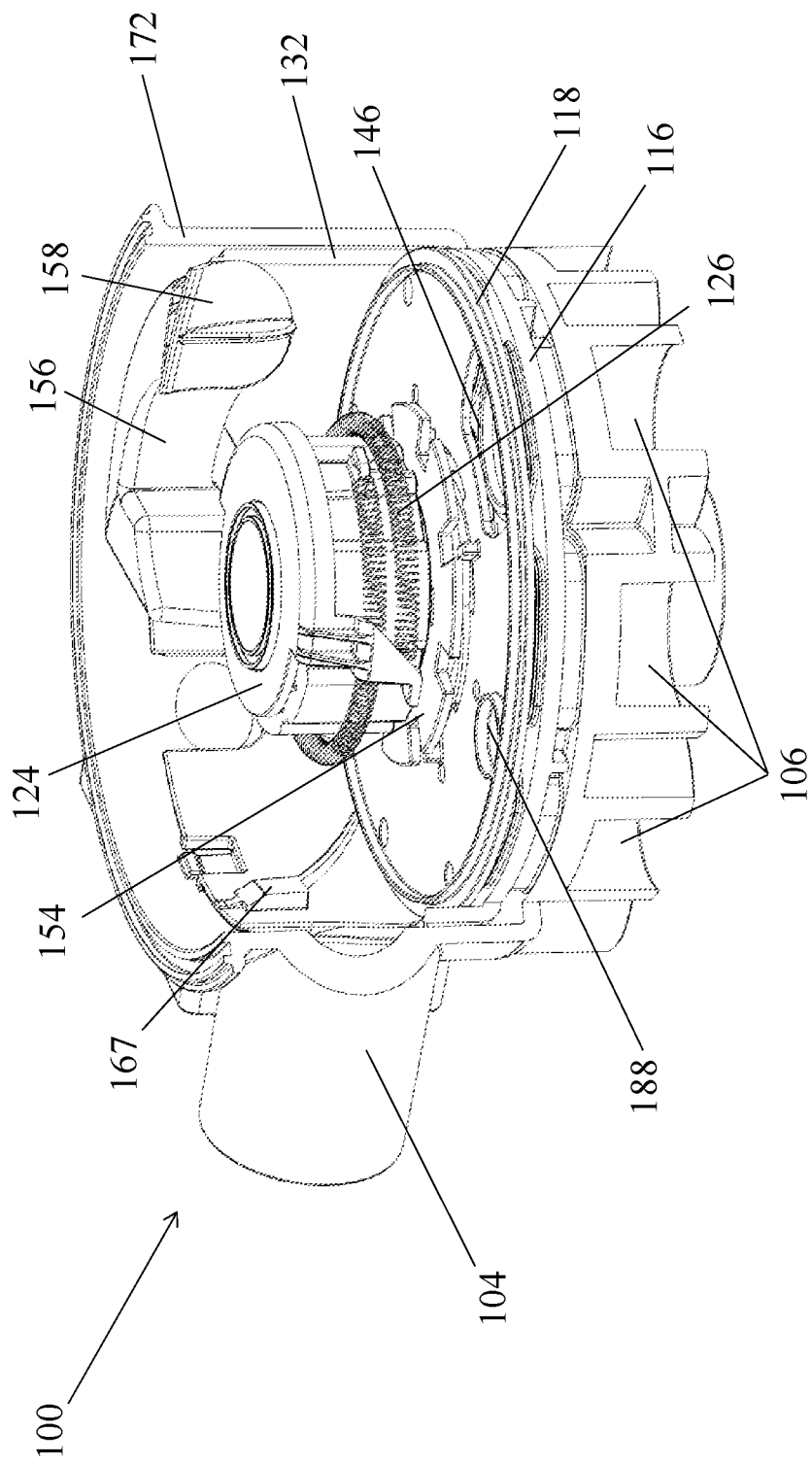
FIG. 5G is a perspective view of the pool cycling valve shown in FIG. 2 with the side wall removed to expose the interior, showing the spring, the spring lock, and the push-down arm.

The ratchet assembly 154 may be rotationally biased toward the closed position (FIG. 9A). For example, as illustrated in FIG. 5G, there may be at least one spring 126 wrapped around the cup 122 of the ratchet assembly 154 and attached to the spring lock 124. The spring lock 124 is rotationally fixed with respect to the valve body 102. Thus, when the ratchet assembly 154 is in the open position (FIG. 9B), there is greater tension in the spring 126 as compared to when the ratchet assembly 154 is in the closed position (FIG. 9A), biasing the ratchet assembly 154 toward the closed position (FIG. 9A). Also illustrated in FIG. 5G, at least one pushdown arm 167 may be fixedly coupled to the cartridge body 116 and in contact with the bottom plate 118. The at least one pushdown arm 167 is configured to bias the bottom plate 118 toward a position in which the outlet port aperture 146 is aligned with an outlet port 106 of the plurality of outlet ports 106. For example, in embodiments with the plurality of ramps 138 discussed above, the bottom plate 118 rotates on top of the plurality of ramps 138. Thus, the pushdown arm 167 applies a force in the direction of the axis of the central column 136, biasing the bottom plate 118 toward positions sitting in the troughs 144. This helps to align the outlet port aperture 146 with an outlet port 106 each time the bottom plate 118 rotates. Thus, when the bottom plate 118 is lifted by the plurality of ramps 138, the outlet port aperture 146 is offset from each of the plurality of outlet ports 106 and when the bottom plate 118 is not supported by the plurality of ramps 138, the outlet port aperture 146 is aligned with an outlet port 106 of the plurality of outlet ports 106.

As a result of the interface 152 between the ratchet assembly 154 and the bottom plate 118, when the ratchet assembly 154 rotates from the closed position (FIG. 9A) to the open position (FIG. 9B) in a first direction, the at least one ratchet arm 150 flexes and rotates past the at least one ratchet tooth 148 without rotating the bottom plate 118. Thus, when the ratchet assembly 154 rotates from the closed position (FIG. 9A) to the open position (FIG. 9B), the bottom plate 118 remains in place. However, when the ratchet assembly 154 rotates from the open position (FIG. 9B) to the closed position (FIG. 9A), in a second direction opposite the first direction, the at least one ratchet arm 150 engages with the at least one ratchet tooth 148 and rotates the bottom plate 118 to align the outlet port aperture 146 with a different outlet port 106 of the plurality of outlet ports 106. As mentioned above, it is an equivalent to flip the orientation of the at least one ratchet tooth 148 and the at least one ratchet arm 150 so that the bottom plate 118 rotates in the opposite direction. In such an embodiment, when the ratchet assembly 154 rotates from the closed position (FIG. 9A) to the open position (FIG. 9B), the at least one ratchet arm 150 engages with the at least one ratchet tooth 148 and rotates the bottom plate 118 to align the outlet port aperture 146 with a different outlet port 106 of the plurality of outlet ports 106, and when the ratchet assembly 154 rotates from the open position (FIG. 9B) to the closed position (FIG. 9A), the at least one ratchet arm 150 flexes and rotates past the at least one ratchet tooth 148 without rotating the bottom plate 118.

Figure 5H:
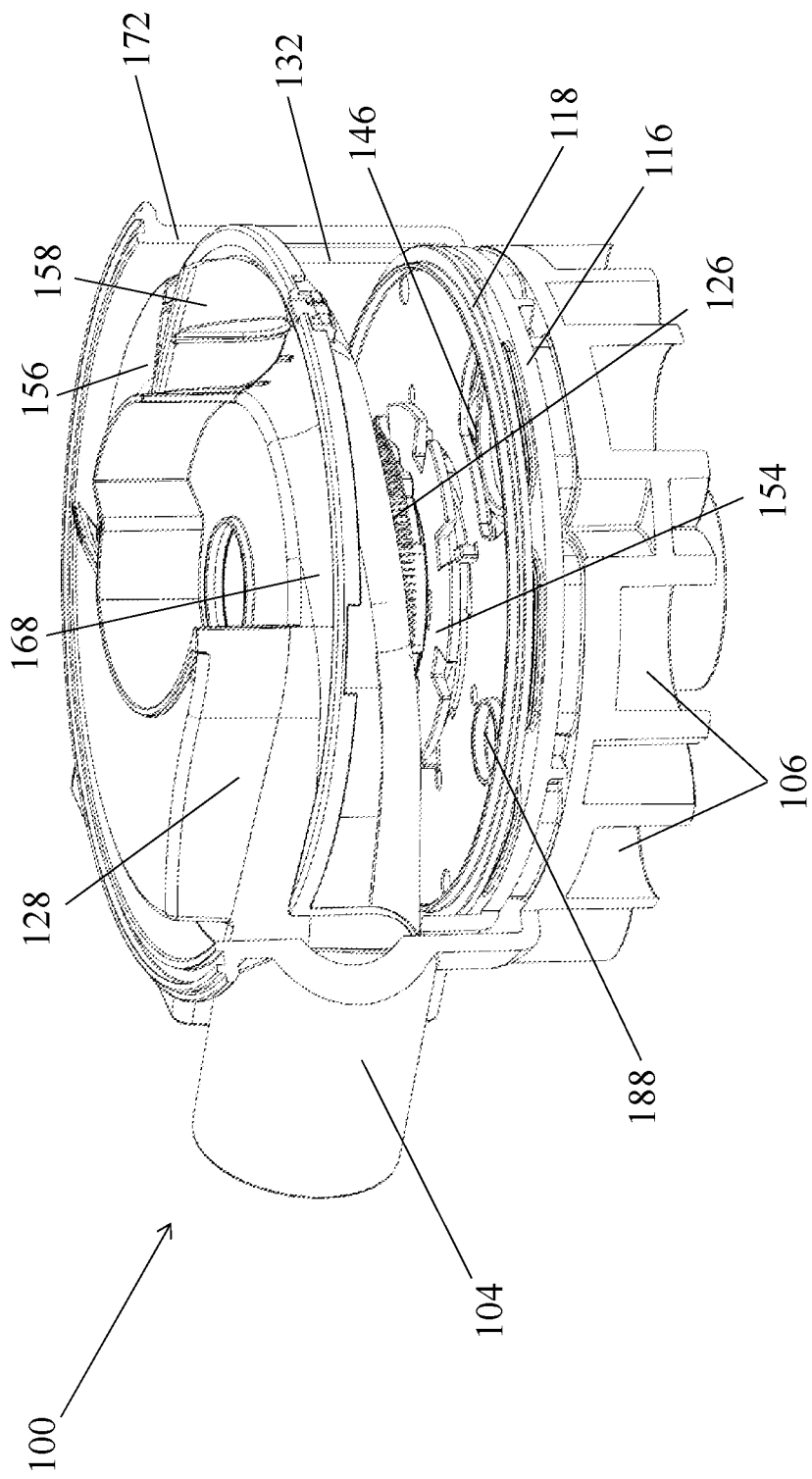
FIG. 5H is a perspective view of the pool cycling valve shown in FIG. 2 with the side wall removed to expose the interior, showing the upper plate.
Figure 5I:
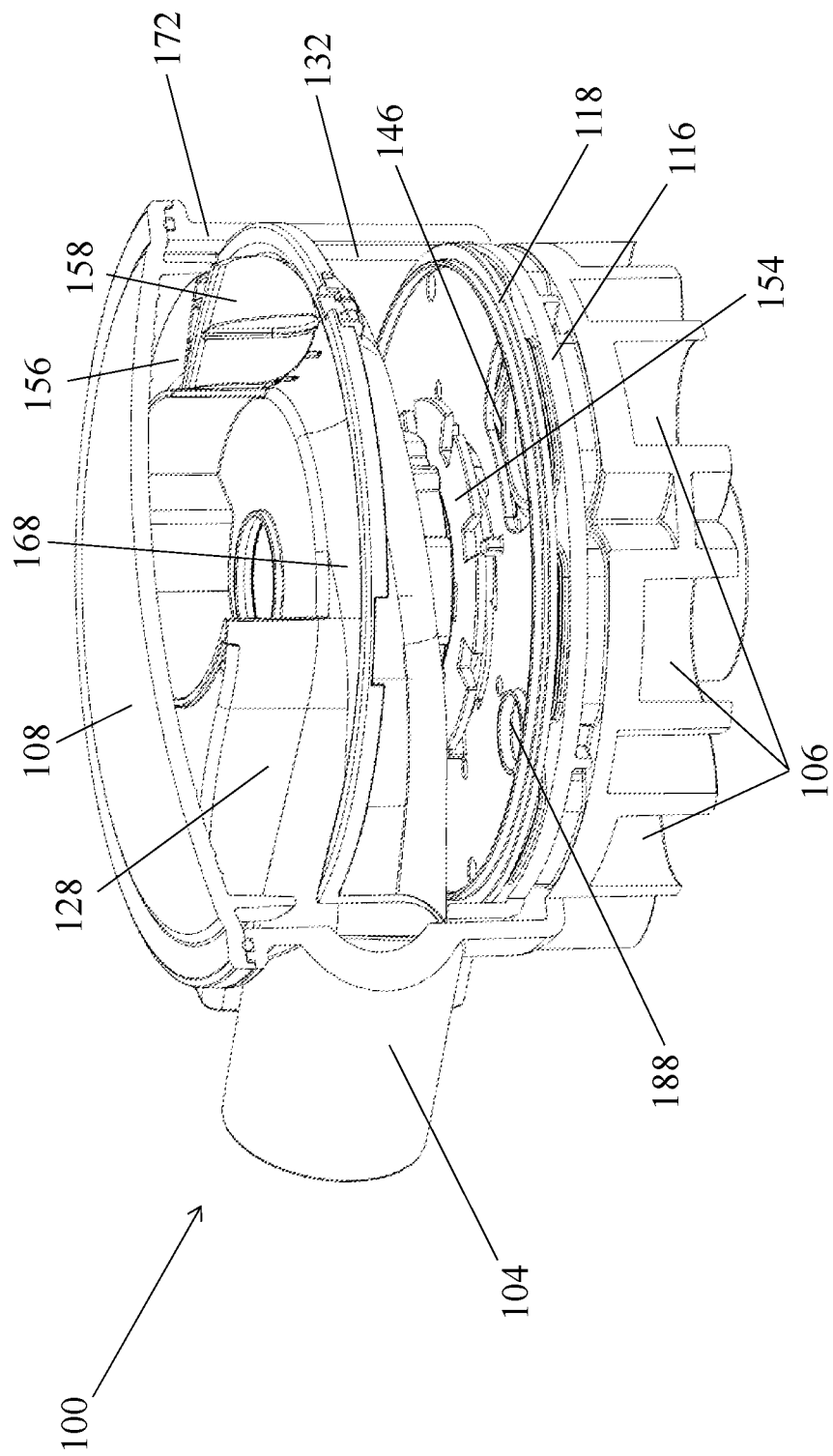
FIG. 5I is a perspective view of the pool cycling valve shown in FIG. 2 with the side wall removed to expose the interior, showing all of the internal components together.

In some embodiments of the pool cycling valve 100, the upper plate 128 is located above the ratchet assembly 154 within the valve body 102, as illustrated in FIG. 5H. The upper plate 128 is rotationally fixed with respect to the valve body 102. The upper plate 128 has a channel 168 configured to receive a stream of water 164 from the at least one inlet port 104 and direct the stream of water 164 toward a channel drain 170 in the upper plate 128. In embodiments having an upper plate 128, when the ratchet assembly 154 is in the closed position (FIG. 9A), the upper arm 156 of the ratchet assembly 154 extends into the channel 168 and is configured to restrict water flow into the channel drain 170, and when the ratchet assembly 154 is in the open position (FIG. 9B), the upper arm 156 is retracted within the channel 168 to open the channel drain 170. The lid 108 covers the upper plate 128 and encloses the cartridge subassembly 114 within the valve body 102 as illustrated in FIG. 5I.

Figure 7A:
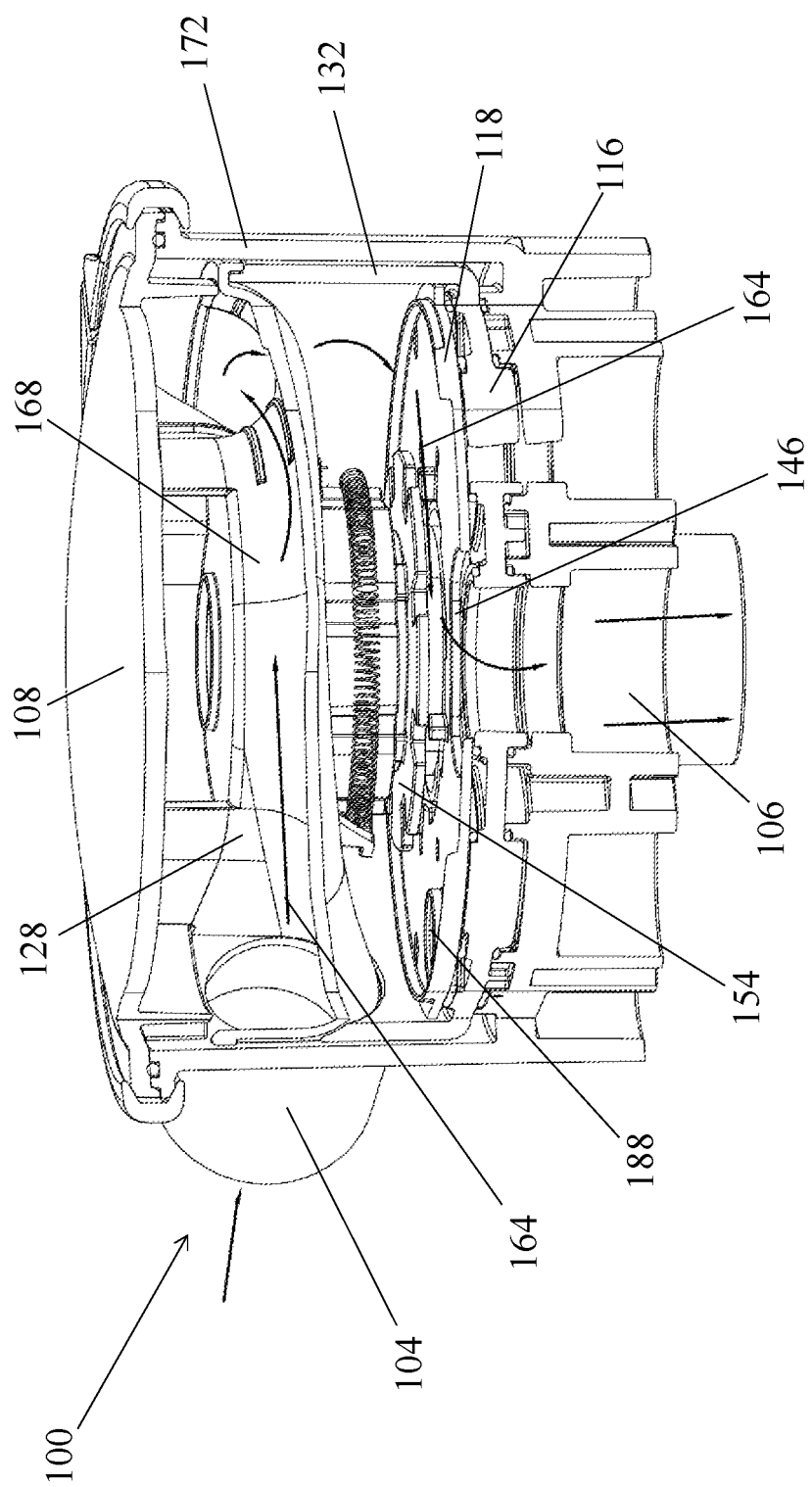
FIG. 7A is a view of the pool cycling valve shown in FIG. 2, with the side surfaces removed to show the interior and arrows drawn to illustrate a first path for the stream of water.
Figure 7B:
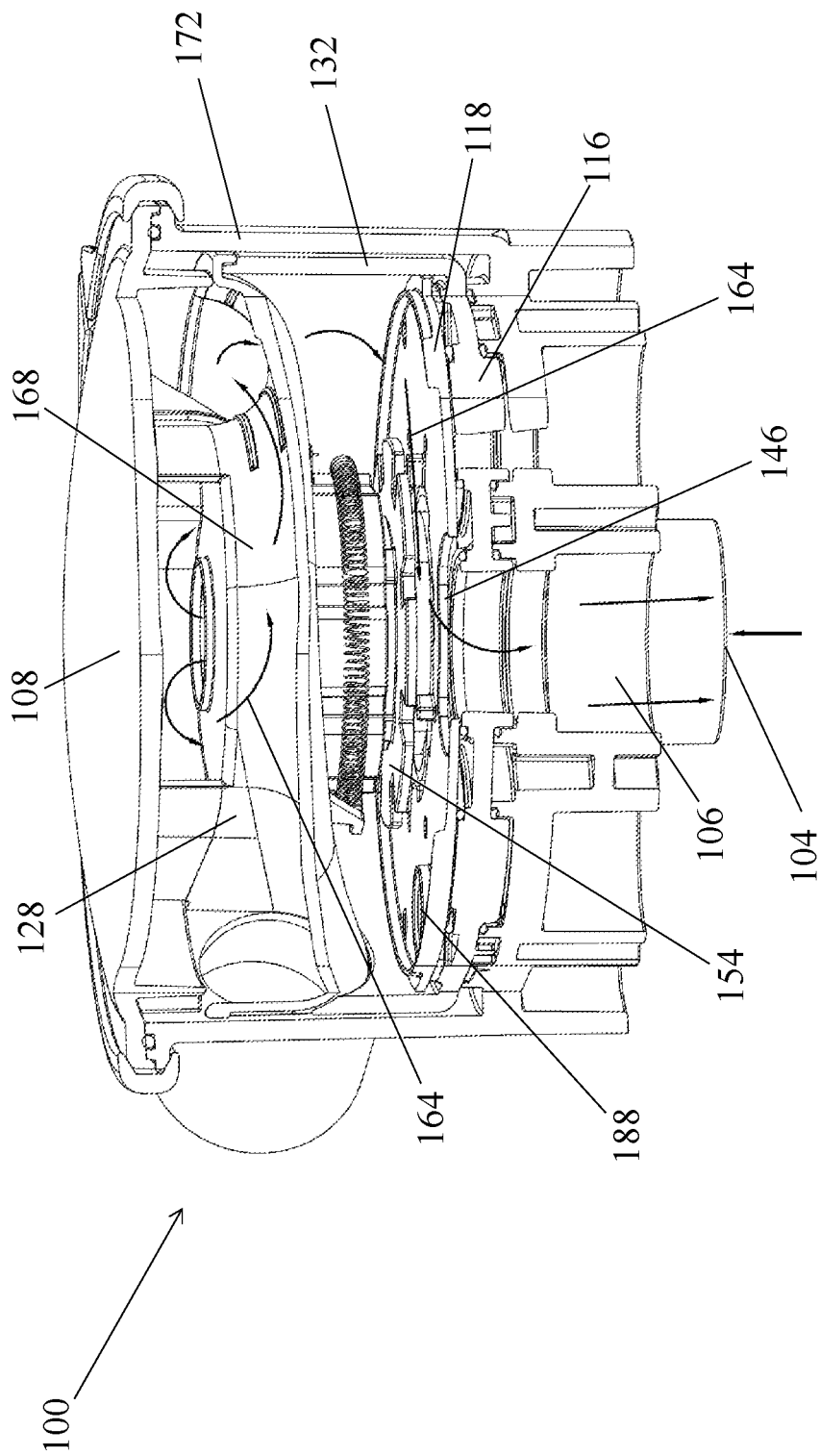
FIG. 7B is a view of the pool cycling valve shown in FIG. 2, with the side surfaces removed to show the interior and arrows drawn to illustrate a second path for the stream of water.

FIGS. 7A-7B illustrate two possible paths for water flow through the pool cycling valve 100. In FIG. 7A, the stream of water 164 enters the pool cycling valve 100 through an inlet port 104 extending through a side wall 172 of the valve body 102 and travels along the channel 168 of the upper plate 128. In FIG. 7B, the stream of water 164 enters the pool cycling valve 100 through an inlet port 104 in the bottom of the valve body 102 and comes up through the center of the valve body 102. The pool cycling valve 100 may have both the side inlet port 104 and the central inlet port 104. This allows the pool cycling valve 100 to be used in various configurations within a pool water system, providing more flexibility and adaptability. The stream of water 164 is directed into the channel 168 of the upper plate 128. In both embodiments, the stream of water 164 is then directed towards the upper arm 156 of the ratchet assembly 154. The stream of water 164 rotates the ratchet assembly 154, and then moves through the channel drain 170 toward the bottom plate 118 and through the outlet port aperture 146 and the outlet port 106 currently aligned with the outlet port aperture 146 to exit the pool cycling valve 100.

Figure 8A:
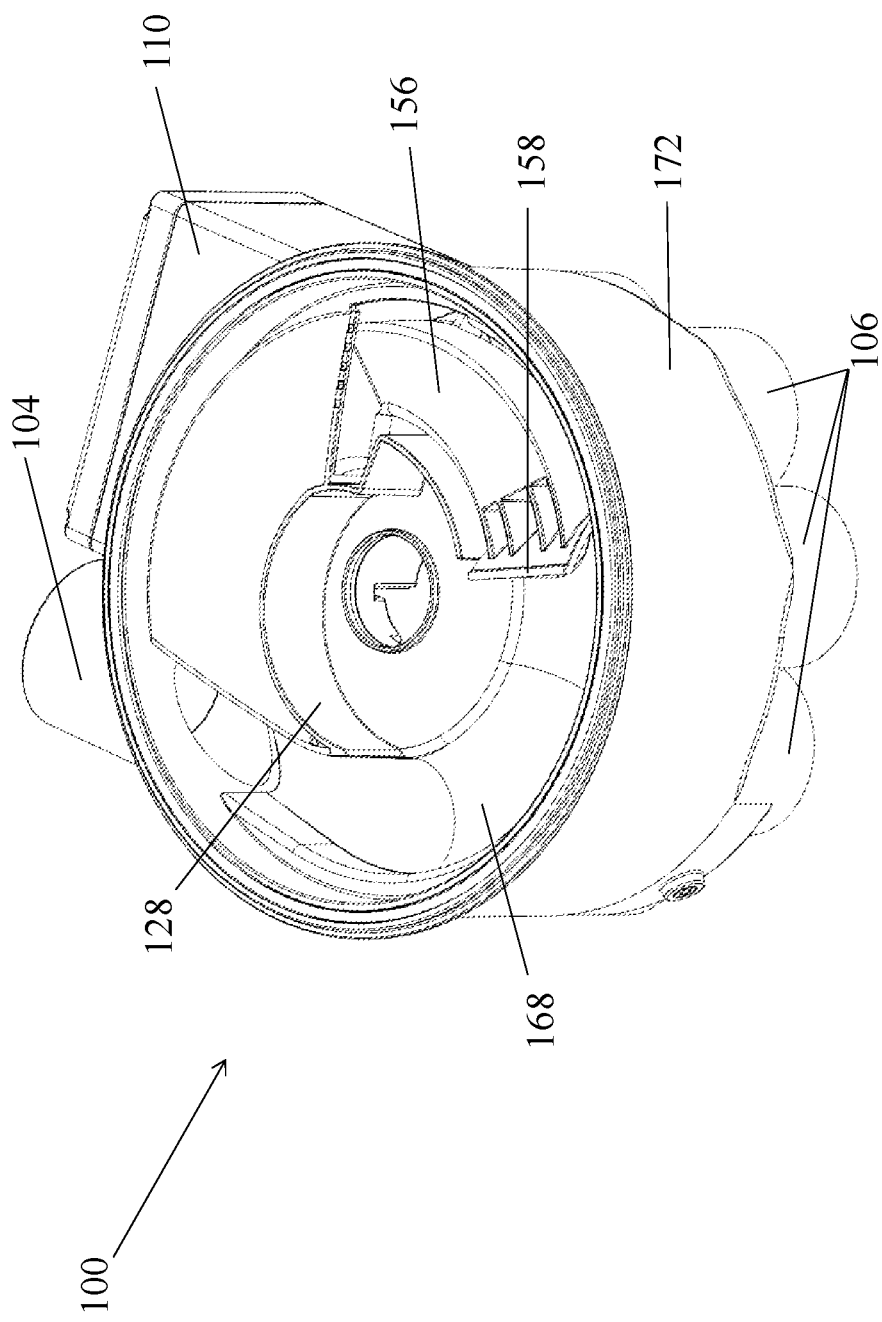
FIG. 8A is a perspective view of the pool cycling valve shown in FIG. 2, with the lid removed and the upper arm in the closed position.
Figure 8B:
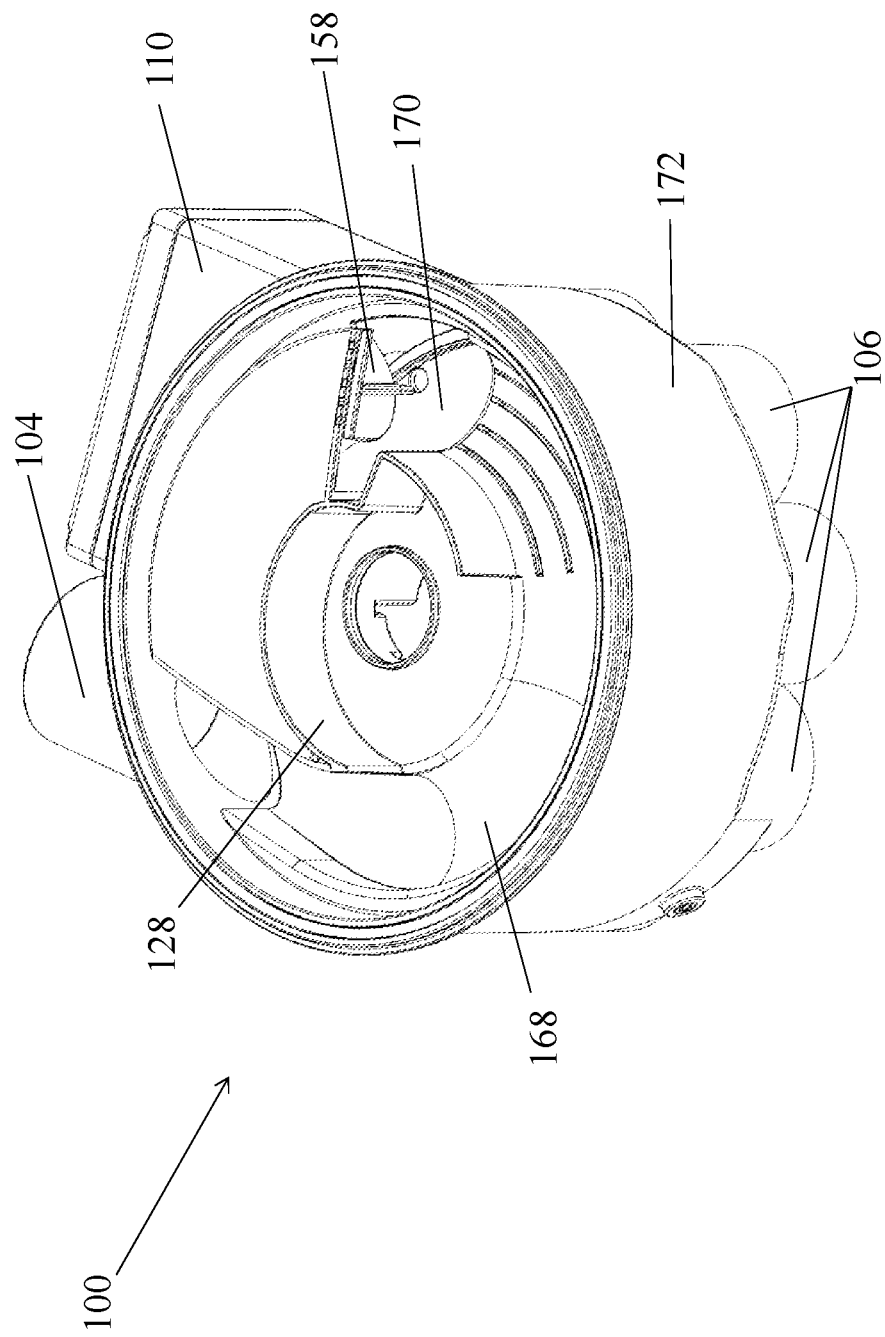
FIG. 8B is a perspective view of the pool cycling valve shown in FIG. 2, with the lid removed and the upper arm in the open position.
Figure 9C:
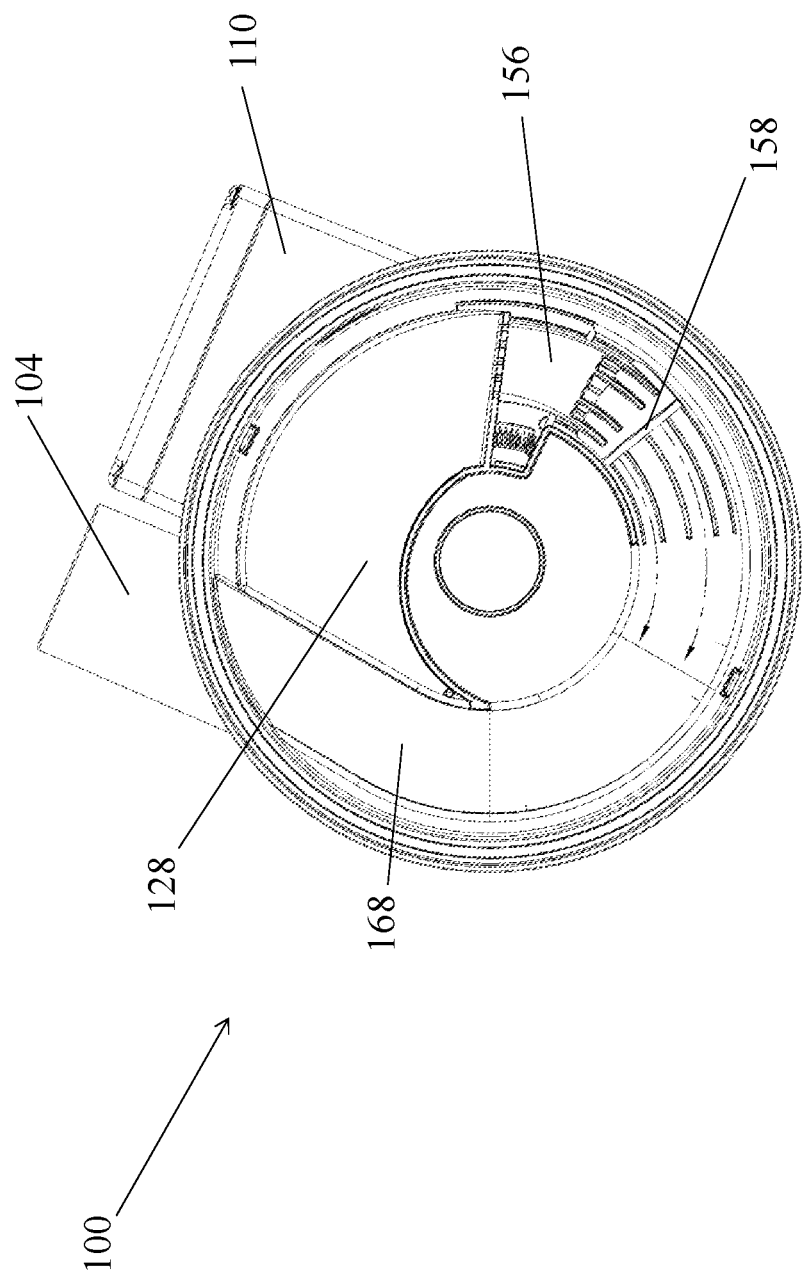
FIG. 9C is a top view of the pool cycling valve shown in FIG. 2, with the lid removed and the upper arm moving from the open position back to the closed position.

FIG. 8A illustrates the pool cycling valve 100 when the ratchet assembly 154 is in the closed position (FIG. 9A). The ratchet assembly 154 is in the closed position (FIG. 9A) when there is not water flow through the pool cycling valve 100. Once the stream of water 164 begins flowing through the pool cycling valve 100, the ratchet assembly 154 moves to the open position (FIG. 9B), as shown in FIG. 8B. This same concept is illustrated by FIG. 9A-9C. When the stream of water 164 first begins flowing through the pool cycling valve 100, the stream of water 164 makes contact with the leading surface 158 of the upper arm 156, as shown in FIG. 9A. In response to the pressure exerted on the leading surface 158 by the stream of water 164, the ratchet assembly 154 rotates from the closed position (FIG. 9A) to the open position (FIG. 9B), allowing the stream of water 164 to move through the channel drain 170, as shown in FIG. 9B. Once the flow of water to the inlet port 104 is reduced, by discontinuing the stream of water 164, the pressure on the leading surface 158 decreases, allowing the bias of the ratchet assembly 154 toward the closed position (FIG. 9A) to rotate the ratchet assembly 154 back to the closed position (FIG. 9A), as shown in FIG. 9C. The position of the outlet port aperture 146, and thus the sequencing of the water flow, is determined by the number of times that the flow of water is cut off through the valve body 102 or the pressure within the valve body 102 is sufficiently reduced, because each time the flow of water is turned on and off or the pressure is sufficiently reduced, the outlet port aperture 146 rotates from aligning with an outlet port 106 to an adjacent outlet port 106. In some embodiments, the position of the outlet port aperture 146 only changes when little to no water pressure is present within the valve body 102. Thus, no energy or water flow is lost during normal flow to power the operation of the valve 100.

Figure 10:
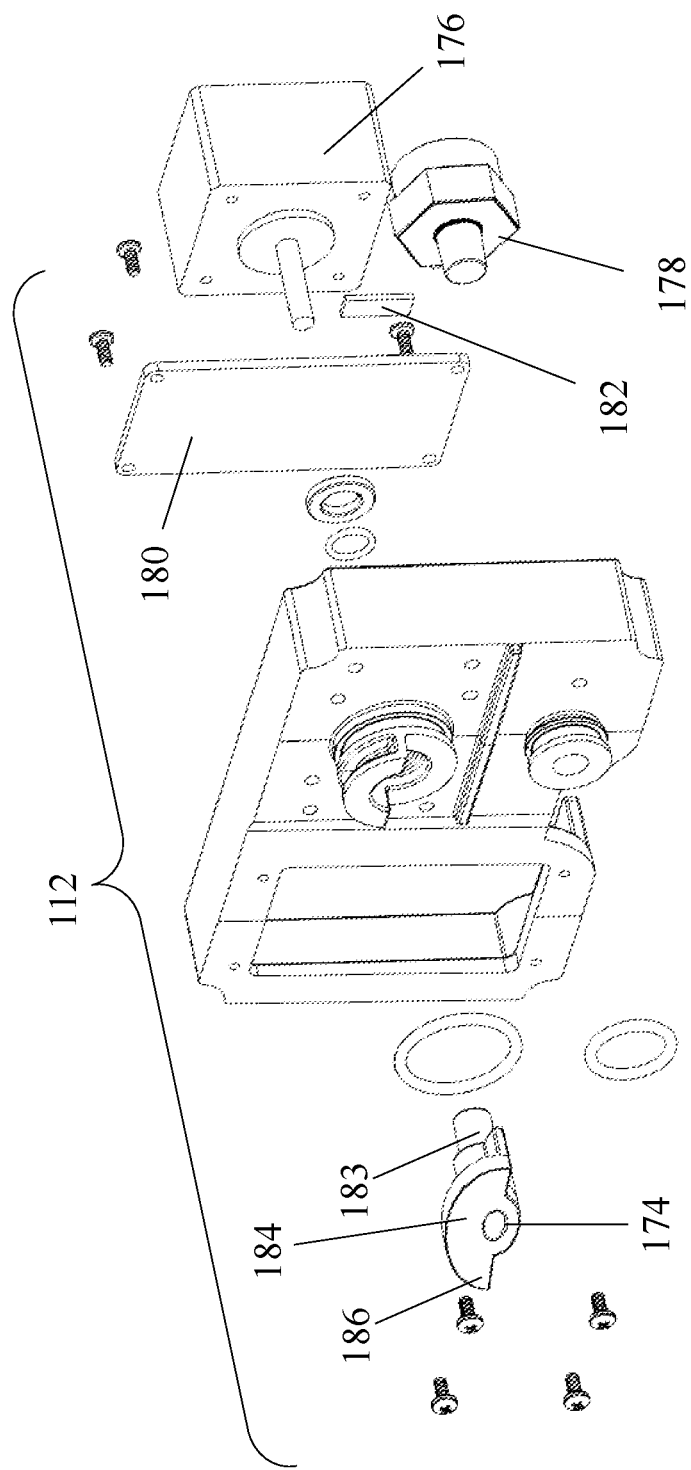
FIG. 10 is an exploded view of the electronics subassembly from FIG. 3.
Figure 11A:
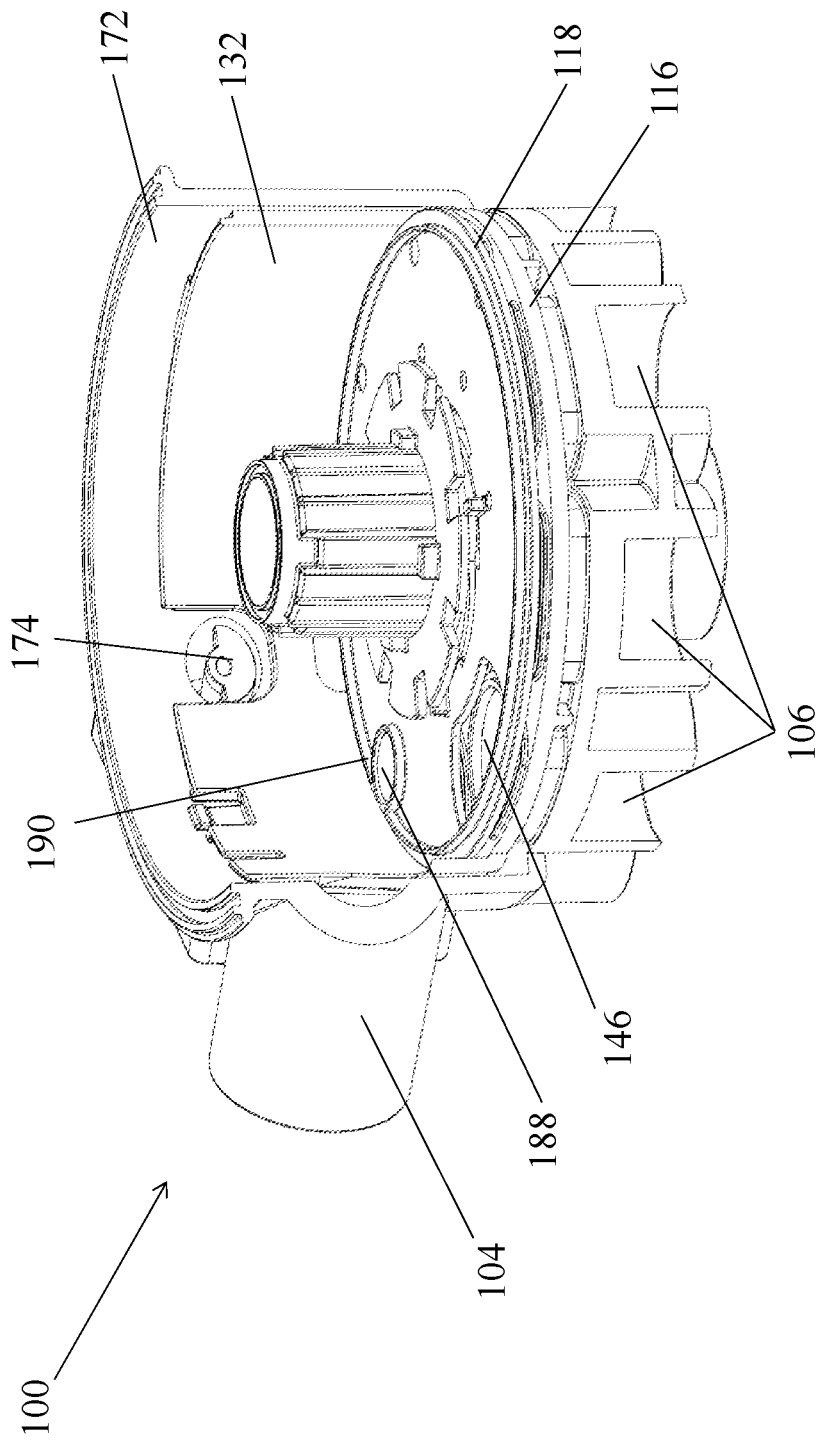
FIG. 11A is a perspective view of the pool cycling valve shown in FIG. 2 with the pausing arm in the unengaged position.
Figure 11B:
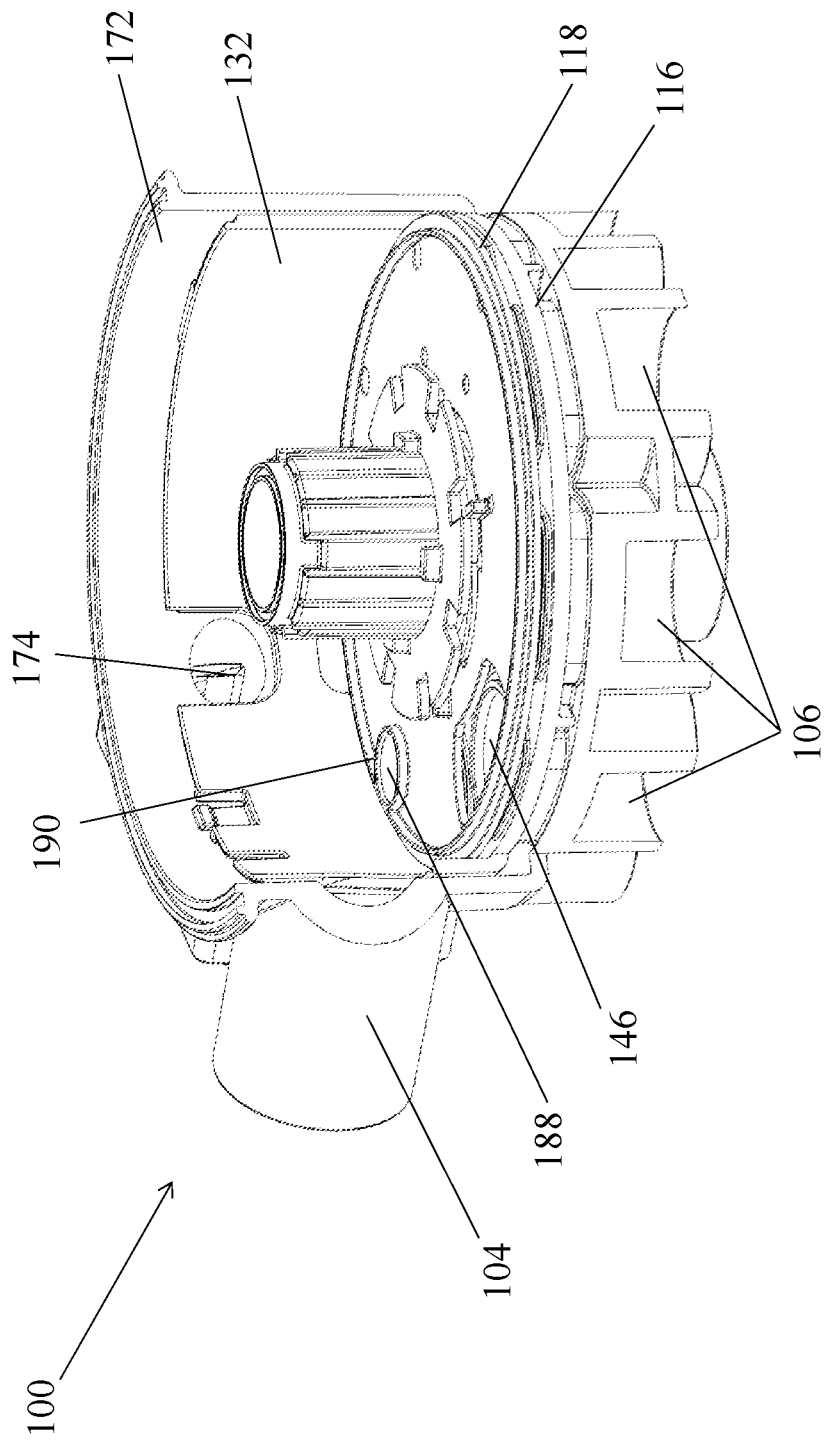
FIG. 11B is a perspective view of the pool cycling valve shown in FIG. 2 with the pausing arm in the engaged position.
Figure 11C:
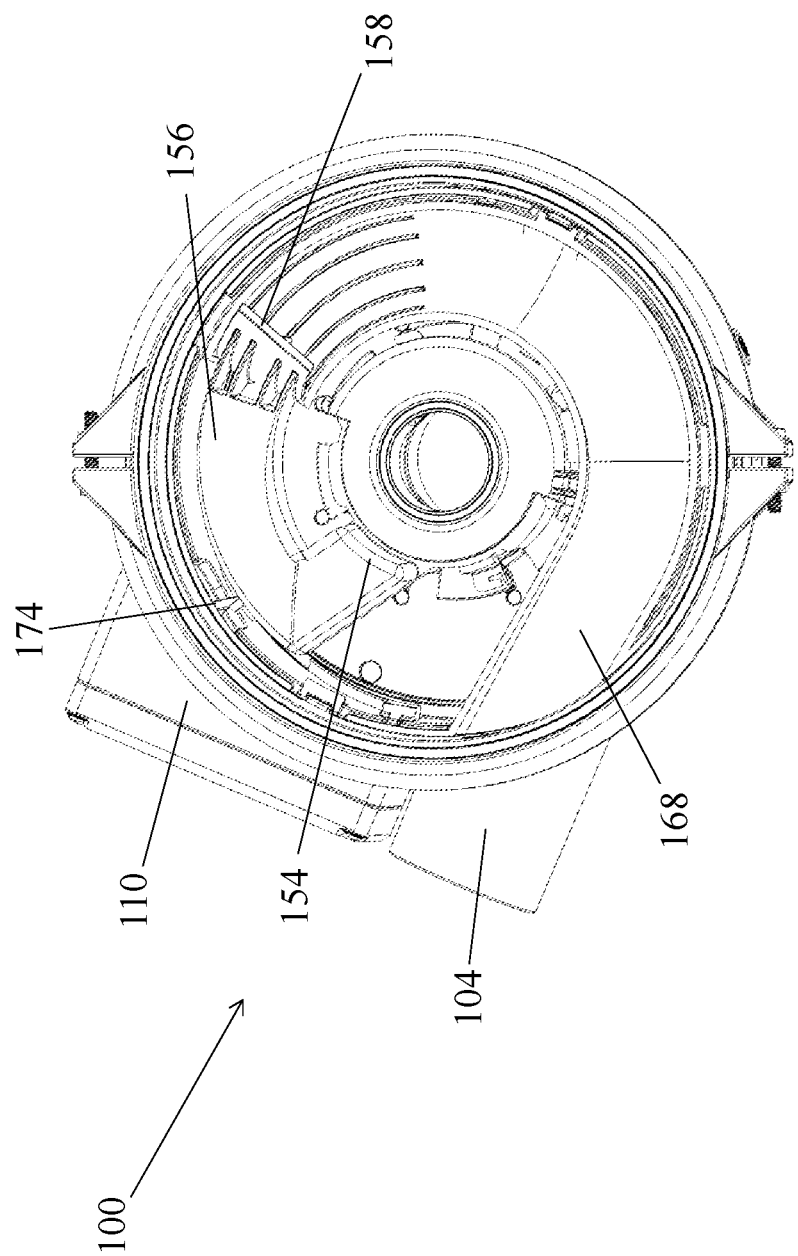
FIG. 11C is a top view of the pool cycling valve shown in FIG. 2, with the lid and a portion of the upper plate removed and the pausing arm in the engaged position.

FIG. 10 illustrates an exploded view of the electronics subassembly 112. The electronics subassembly 112 may comprise a pausing arm 174, an actuator or motor 176, a pressure sensor 178, a printed circuit board (PCB) 180, and a position sensor 182. A pausing arm includes anything that extends toward the ratchet assembly 154 or bottom plate 118 to restrict movement of the bottom plate 118 or ratchet assembly 154 when it would ordinarily be operated upon to move. Such pausing arms may include pins, friction breaks, flags, projections, and any other structures known to restrict or impede rotational movement of an object. In the particular embodiment illustrated in FIG. 10, the pausing arm 174 extends through the side wall 172 of the valve body 102, as shown in FIG. 11A. The pausing arm 174 embodiment in FIG. 10 has an axle 183 and a front surface 184. The axle 183 of the pausing arm 174 is not perpendicular to the front surface 184 and the axis of the axle 183 is offset from passing through the center of the central column 136. Thus, when the pausing arm 174 is in an unengaged position, the front surface 184 is flush with the curvature of the side wall 172 and does not protrude into the interior of the valve body 102. However, when the pausing arm 174 is rotated about 180 degrees by the motor 176 to an engaged position, a corner 186 of the front surface 184 protrudes into the interior of the valve body 102, as shown in FIG. 11B. This allows the pausing arm 174 to make contact with the ratchet assembly 154 when the ratchet assembly 154 is in the open position (FIG. 9B), thus locking the ratchet assembly 154 in the open position (FIG. 9B), as shown in FIG. 11C. The pausing arm 174 is configured to restrict rotation of the bottom plate 118 such that the bottom plate 118 is rotationally stationary regardless of a change of water pressure within the valve body 102. The pausing arm 174 can thus be used to keep the bottom plate 118 aligned with the same outlet port 106 while the flow of water is turned off and on repeatedly to control movements of devices such as pool cleaning heads 40 or other accessories 50, from any of the plurality of outlet ports 106. When multiple pool cycling valves 100 are used together, this feature allows the second pool cycling valve 100 to be controlled without changing the position of the first pool cycling valve 100, as shown in FIG. 1.

Figure 12:
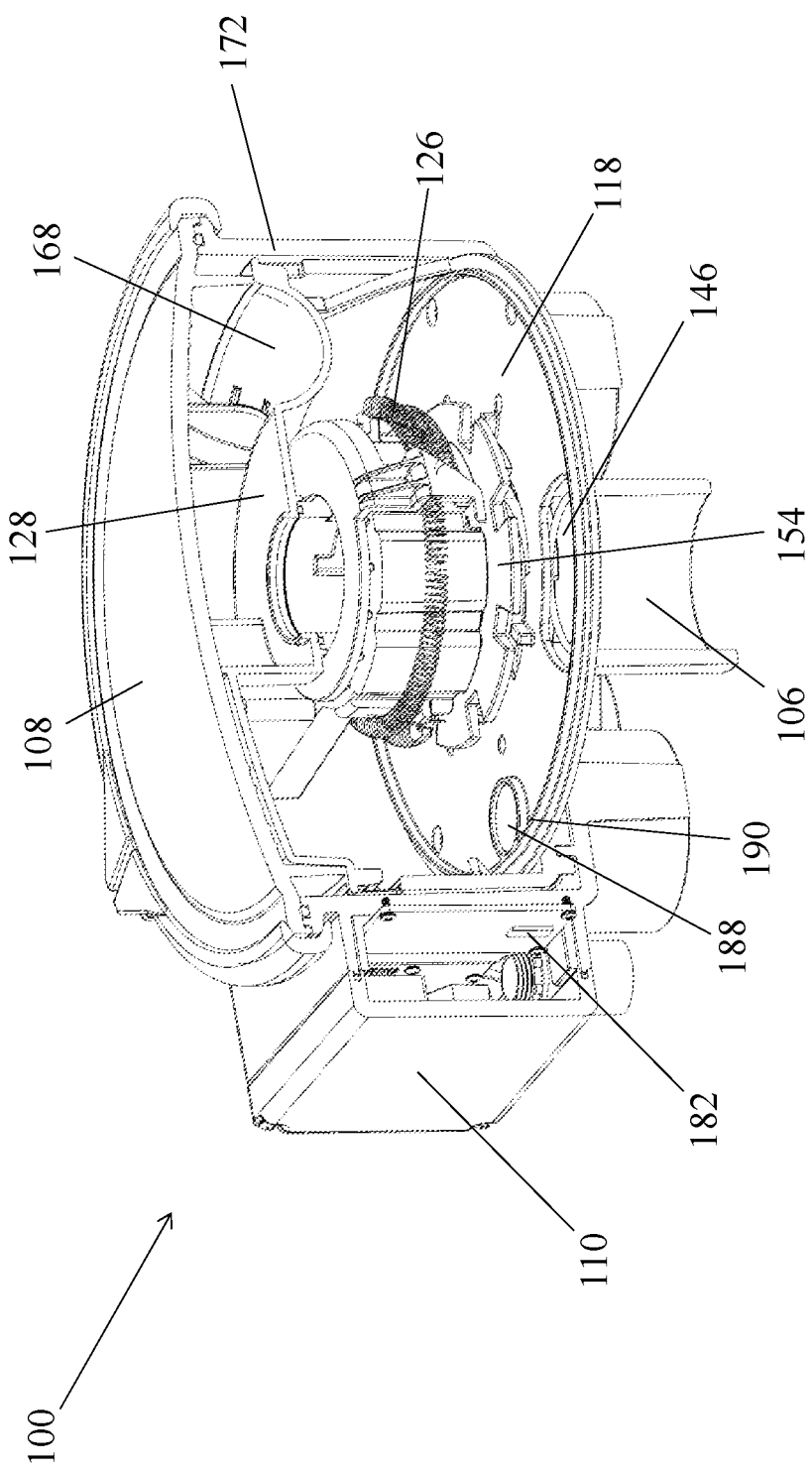
FIG. 12 is a cross-sectional view of the pool cycling valve shown in FIG. 2, illustrating the position sensor and the magnet in a position adjacent to the position sensor.

Returning to FIG. 10, the pressure sensor 178 is used to monitor the pressure within the pool cycling valve 100. When the pressure sensor 178 indicates an unexpected spike or drop in pressure, this can alert the user of a need for maintenance. Additionally, water flow through the valve can be calculated and displayed. The PCB 180 communicates with components within the electronics box 110 and an external system controller. In addition, the PCB 180 allows the user to control each of the electrical components, such as the pausing arm 174. The PCB 180 may have a wireless connection to allows the user to control and monitor the pool cycling valve 100 using an app, internet browser, or some other wireless-enabled device. The position sensor 182 may be located on the side wall 172 of the valve body 102 adjacent to or within the PCB 180, as illustrated in FIG. 12. The position sensor 182 is configured to sense the rotational position of the bottom plate 118. In some embodiments, the bottom plate 118 has a magnet 188 positioned on an edge 190 of the bottom plate 118. The position sensor 182 is configured to sense the magnet 188 when the magnet 188 is adjacent the position sensor 182. Thus, each time the bottom plate 118 makes a complete turn of 360 degrees, the magnet 188 passes adjacent the position sensor 182 and the position sensor 182 recalibrates the position of the magnet 188, and thus the position of the outlet port aperture 146. In this way, any error in the rotation of the bottom plate 118 is corrected within one complete turn of the bottom plate 118. Other varieties and types of position sensors 182 may be implemented, with the essential feature being that the position sensor 182 provides information on the current rotational position of the bottom plate 118 and thus the outlet port aperture 146. Thus, the function of the pool cycling valve 100 can be accurately controlled and specific outlet ports 106 can be selected. This provides the system with the necessary information to carry out programming to implement specific water flow durations and water flow cycles. As stated above, multiple pool cycling valves 100, cleaning heads, and other devices can be joined into any configuration. This improves the efficiency of pool cleaning systems.

Based on the above disclosure, the pool cycling valve 100 may be operated using the following steps. The stream of water 164 may be received into the valve body 102 through an inlet port 104, with the ratchet assembly 154 in the closed position (FIG. 9A). The stream of water 164 may be directed toward the leading surface 158 of the upper arm 156 of the ratchet assembly 154. The ratchet assembly 154 may be rotated by the predetermined angle 166 from the closed position (FIG. 9A) to the open position (FIG. 9B). Rotating the ratchet assembly 154 by the predetermined angle 166 may additionally store rotational energy in the ratchet assembly 154 through the spring 126. The rotation by the predetermined angle 166 may be carried out by exerting pressure on the ratchet assembly 154 with the stream of water 164. The stream of water 164 may be directed to the bottom plate 118 and discharged from the valve body 102 through the outlet port aperture 146 and the outlet port 106.

The ratchet assembly 154 may be paused in the open position (FIG. 9B) by the pausing arm 174, which may be extended into the interior of the valve body 102 to engage with the ratchet assembly 154. The ratchet assembly 154 may be rotated from the open position (FIG. 9B) to the closed position (FIG. 9A), and the outlet port aperture 146 may be aligned with a different outlet port 106 of the plurality of outlet ports 106. The ratchet assembly 154 may be rotated from the open position (FIG. 9B) to the closed position (FIG. 9A) using the stored rotational energy. In aligning the outlet port aperture 146 with a different outlet port 106, the at least one ratchet arm 150 may be engaged with the at least one ratchet tooth 148 and the bottom plate 118 may be rotated with the ratchet assembly 154. To rotate the ratchet assembly 154 from the open position (FIG. 9B) to the closed position (FIG. 9A), the pressure on the ratchet assembly 154 may be decreased, and to decrease the pressure on the ratchet assembly 154, the flow of the stream of water 164 through the inlet port 104 may be lessened.

In another embodiment, the pool cycling valve 100 may be operated using the following steps. The outlet port aperture 146 may be aligned with a first outlet port 106 of the plurality of outlet ports 106 of the valve body 102. This step may be taken in response to a change of water pressure within the valve body 102, such as a reduction of water pressure within the valve body 102. The reduction of water pressure may be a reduction of at least 50%. The water pressure within the valve body 102 may be increased. A first stream of water 164 may be received into the valve body 102 through an inlet port 104. Rotational energy from the first stream of water 164 may be stored within the pool cycling valve 100, such as in a spring 126. The first stream of water 164 may be directed to the outlet port aperture 146 and discharged from the valve body 102 through the outlet port aperture 146 and through the first outlet port 106. The water pressure within the valve body 102 may be decreased. The outlet port aperture 146 may be aligned with a second outlet port 106 of the plurality of outlet ports 106 in response to a reduction of water pressure within the valve body 102. The stored rotational energy from the first stream of water 164 may be used to align the outlet port aperture 146 with the second outlet port 106. The water pressure within the valve body 102 may be increased. A second stream of water 164 may be received into the valve body 102 through the inlet port 104. Rotational energy from the second stream of water 164 may be stored within the pool cycling valve 100. The second stream of water 164 may be directed to the outlet port aperture 146 and discharged from the valve body 102 through the outlet port aperture 146 and through the second outlet port 106. The water pressure within the valve body 102 may be decreased. The outlet port aperture 146 may be aligned with a third outlet port 106 of the plurality of outlet ports 106 in response to a reduction of water pressure within the valve body 102. The stored rotational energy from the first stream of water 164 may be used to align the outlet port aperture 146 with the second outlet port 106.

The method outlined above may also include steps such as holding the bottom plate 118 stationary while repeating the steps of increasing the water pressure within the valve body 102, receiving a stream of water 164 into the valve body 102 through the inlet port 104, directing the stream of water 164 to the outlet port aperture 146, discharging the stream of water 164 from the valve body 102 through the outlet port aperture 146, and decreasing the water pressure within the valve body 102. Additionally, the method may include sensing the rotational position of the bottom plate 118. Aligning the outlet port aperture 146 with the second outlet port 106 and aligning the outlet port aperture 146 with the third outlet port 106 may each occur immediately after decreasing the water pressure within the valve body 102. In addition, increasing the water pressure may occur after aligning the outlet port aperture 146 with the first outlet port 106.

Generally, the ratchet assembly 154 is cocked upon initiation of water flow to the valve 100. The ratchet assembly 154 may also be cocked upon cessation of water flow to the valve 100. Thus, during operation of the valve 100 when the stream of water 164 flows through the valve 100, the ratchet assembly 154 and the bottom plate 118 are stationary. Thus, no water flow is used during operation of the valve 100 to cause the ratchet assembly 154 or the bottom plate 118 to rotate. This decreases the head loss, allowing the pump 10 to function more efficiently. In addition, because the position of the outlet port aperture 146 only changes when little or no water pressure is present within the valve body 102, there is very little loss of water flow or pressure when the outlet port aperture 146 is in a position between two adjacent outlet ports 106. In other words, the valve 100 is configured to provide all of the water flow through one outlet port 106 at any given time, instead of occasionally splitting the water flow between two different outlet ports 106. This improves the performance of the valve 100 in operating the cleaning system 20.

Additionally, because the pool cycling valve 100 does not involve turbines, gears, or other mechanical devices that require energy from the water flow to function, the pump 10 does not need to expend energy in driving mechanisms that exert such resistance. This reduces the energy required to run the pool systems, and removes the need for maintenance that is typically required to keep the turbines, gears, and other mechanical devices running, as these components often experience significant wear over time.

Using the interruption of water flow to operate the valve 100 as disclosed above allows for a number of benefits. First, each outlet port 106 can be run for as long as needed, and various outlet ports 106 can be skipped as desired. Any pattern or sequence can be selected. In addition, a smaller system pump 10 can be used due to the lower pressure loss as explained above, leading to significant energy savings. A further use of the valve 100 disclosed herein is with a cleaning system 20 which implements cleaning heads or devices 40 that require cycles of water flow to function, such as those which rotate or are directionally controlled. The valve 100 may be paused on a specific outlet port 106, and then turned on and off repeatedly. This allows the cleaning heads 40 to clean the first zone 30 of the pool before the cleaning system 20 moves on to the next zone 30. In this way, debris can be swept toward the drain of the pool, rather than simply stirring the debris up into the water.

Causing the bottom plate 118 to rotate, such as by interrupting water flow to the pool cycling valve 100, may be accomplished using a number of methods, either within the valve 100 or at any location from the pump 10 to the valve 100. For example, water flow may be interrupted by cycling or changing the speed of the pump 10. The pump 10 may be a soft start pump, a variable speed pump, or a multiple speed pump. The pump 10 may be cycled or flow may be reduced. A valve or similar device to stop or reduce flow to the pool cycling valve 100 may also be utilized. In addition, the water flow may be switched or redirected to another valve 100, or a bypass method may be implemented to pause the flow. Bypass methods include passing the water flow to the pool or using a cleaning system pump return.

Using the structure and system identified above, a unique system for intelligently and selectively operating a cleaning system for a pool may be implemented. Using particular embodiments of the structure and system identified herein, a controller for the pool cycling valve system may be configured by a user to selectively control new and unique features not previously controllable in a pool cycling valve and cleaning system. These features include at least: 1) sensing and remembering which specific pool cycling valve zone is active for the system at any particular time; 2) pausing on a selected pool cycling valve zone for a user-defined period of time that can be different for each zone; and 3) selectively repeating or skipping a pool cycling valve zone for a user-defined number of cycles that can be different for each zone. The combination of these new features enables pool cycling valve zone capabilities previously unknown in the industry and a unique system for intelligently and selectively operating the pool cycling valve and cleaning system in ways not previously possible.

Figure 13:
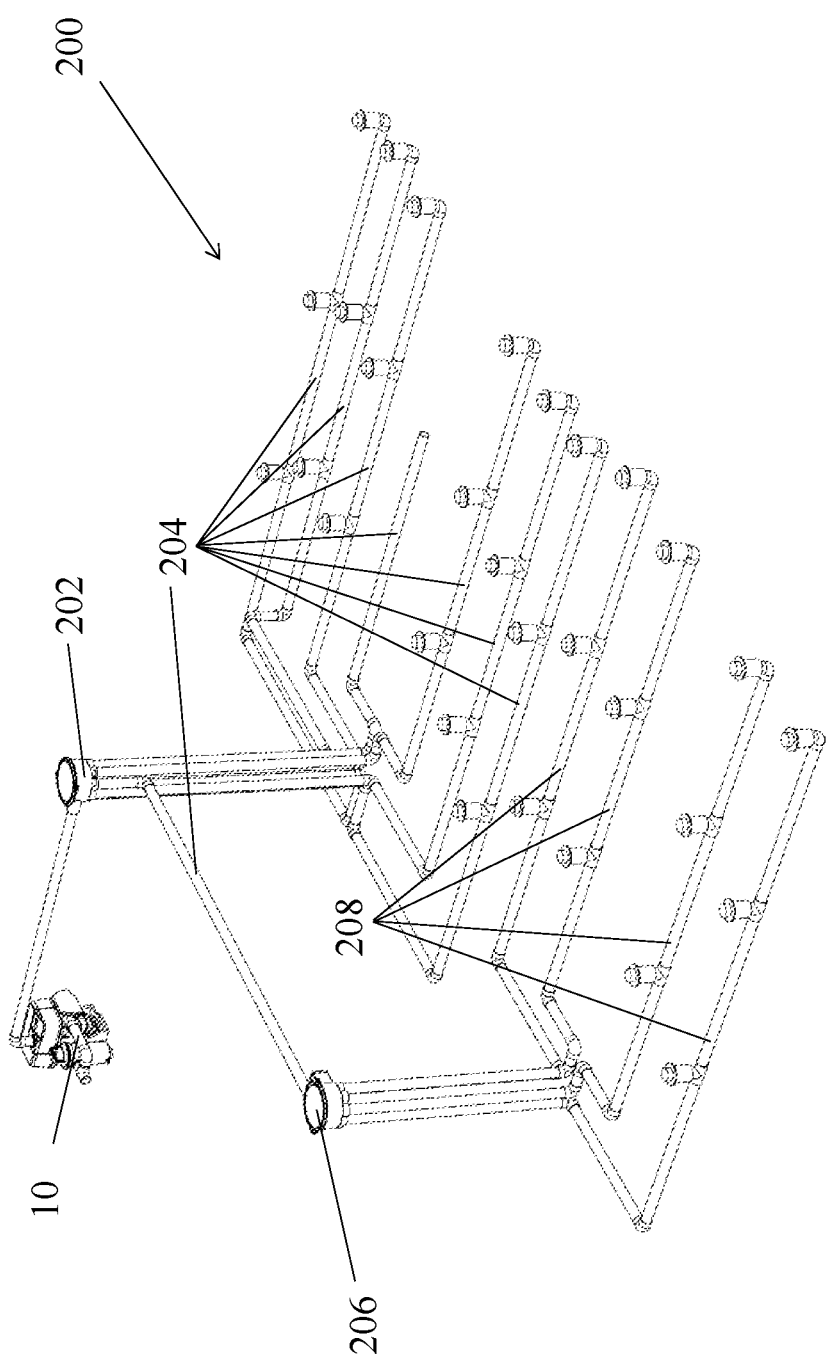
FIG. 13 is a perspective view of a pool cycling valve system similar to the environment of a pool cycling valve shown in FIG. 1.

The valve 100 disclosed above may be implemented into a pool cycling valve system 200, as shown in FIG. 13. The pool cycling valve system 200 may comprise a first pool cycling valve 202 with the same features as the pool cycling valve 100 as discussed above, a first position sensor 182, a first pausing arm 174, a first plurality of water zones 204, an interface configured to receive input from a user, and a microcontroller communicatively coupled to the interface. The first pool cycling valve 202 has a first valve body 102 with a first inlet port 104 and a first plurality of outlet ports 106. The first pool cycling valve 202 is configured to move a first outlet port aperture 146 to align with a first different outlet port 106 of the first plurality of outlet ports 106 in response to a change of water pressure within the first valve body 102. The change of water pressure may be a reduction of at least 50%. The first position sensor 182 is configured to determine a position of the first outlet port aperture 146, and the first pausing arm 174 is configured to interfere with the movement of the first outlet port aperture 146 when the first pausing arm 174 is engaged, regardless of a change of water pressure within the first valve body 102. In addition, each of the first plurality of water zones 204 is configured to fluidly couple with a respective outlet port 106 of the first plurality of outlet ports 106. Thus, the first pool cycling valve 202 essentially controls which zone 204 receives water by using the position sensor 182 to determine the location of the outlet port aperture 146, and the pausing arm 174 to control whether the outlet port aperture 146 moves to align with a different outlet port 106.

As mentioned above, the interface is configured to receive input from a user. The input may be for a user-selected sequence for activating each water zone 30, including the first plurality of water zones 204. In other words, the user may indicate the order in which the user desires the water zones 30 to be activated using the interface. Activation of a water zone 30 occurs when the outlet port aperture 146 is aligned with the outlet port 106 that corresponds with that water zone 30. The input may also be for a user-selected duration of activated time per water zone 30 prior to activation of a subsequent water zone 30. This allows the user to indicate an amount of time during which the outlet port aperture 146 remains aligned with each specific outlet port 106. The input may also be used for a number of water pressure cycles for a particular water zone 30 to receive prior to the activation of the subsequent water zone 30. Thus, the input from the user indicates the parameters required to determine how the pool cycling valve system 200 is to be operated.

For each of the plurality of water zones 30, the duration of activated time and the number of water pressure cycles may be carried out without moving the outlet port apertures 146 to align with a different outlet port 106. In addition, each of these parameters may be different for each of the water zones 30. For example, the duration of activated time may be different for each of the water zones 30. In addition, or alternatively, the number of water pressure cycles may be different for each water zone 30. The interface is configured to communicate the input to the microcontroller and the microcontroller is configured to implement the indicated parameters by controlling the first pool cycling valve 202, the movement of the first outlet port aperture 146, and the first pausing arm 174. The microcontroller thus intelligently and selectively discharges water to each of the first plurality of water zones 30 based on the input received from the interface.

The pool cycling valve system 200 may also comprise a second pool cycling valve 206 with the same features of the valve 100, a second position sensor 182, a second pausing arm 174, and a second plurality of water zones 208 of the water zones 30, as shown in FIG. 13. The second pool cycling valve 206 has a second valve body 102 with a second inlet port 104 and a second plurality of outlet ports 106. The second pool cycling valve 206 is configured to move a second outlet port aperture 146 to align with a second different outlet port 106 of the second plurality of outlet ports 106 in response to a change of water pressure within the second valve body 102. The change of water pressure may be a reduction of at least 50%. The second position sensor 182 is configured to determine a position of the second outlet port aperture 146, and the second pausing arm 174 is configured to interfere with the movement of the second outlet port aperture 146 when the second pausing arm 174 is engaged, regardless of a change of water pressure within the second valve body 102. In addition, each of the second plurality of water zones 208 is configured to fluidly couple with a respective outlet port 106 of the second plurality of outlet ports 106. Thus, the second pool cycling valve 206 essentially controls which zone 208 receives water by using the position sensor 182 to determine the location of the outlet port aperture 146, and the pausing arm 174 to control whether the outlet port aperture 146 moves to align with a different outlet port 106. The second inlet port 104 may be configured to receive water flow from a connected first outlet port 106 of the first plurality of outlet ports 106. In other words, the second pool cycling valve 206 may correspond to one of the first plurality of zones 204, as shown in FIG. 13.

In embodiments with a first pool cycling valve 202 and a second pool cycling valve 206, the same microcontroller may be used to control both valves 202, 206. The microcontroller thus may be further configured to control the second pool cycling valve 206, the movement of the second outlet port aperture 146, and the second pausing arm 174 to intelligently and selectively discharge water to each of the second plurality of water zones 208 based on the input received from the interface.

The pool cycling valve system 200 may also comprise a pump 10 and a plurality of pool cleaning heads 40. The pump 10 may be communicatively coupled to the microcontroller and configured to supply water to the first inlet port 104 of the first pool cycling valve 202. In addition, the microcontroller may be configured to control the pump 10 to supply water to the first pool cycling valve 202 based on the input received from the interface. For example, the microcontroller may turn the pump 10 on and off to create the desired water pressure cycles, and to create the necessary changes in water pressure to align the outlet port aperture 146 with a different outlet port 106. Each water zone 30 may be fluidly coupled to a portion of the plurality of pool cleaning heads 40.

A method for operating the pool cycling valve system 200 is explained below. Input may be received from a user at the interface for at least one of a user-selected sequence for activating each water zone 30, a user-selected duration of activated time per water zone 30 prior to activation of a subsequent water zone 30, and a number of water pressure cycles for a particular water zone 30 to receive prior to the activation of the subsequent water zone 30. The input may specify a different duration of activated time for each water zone 30. In addition, the input may specify a different number of water pressure cycles for each water zone 30. The input may be communicated to the microcontroller configured to control at least one pool cycling valve 100 of the pool cycling valve system 200. The plurality of water zones 30 may be activated and deactivated by intelligently and selectively discharging water to each of the plurality of water zones 30 based on the input received from the interface. Activating the plurality of water zones 30 may comprise receiving a stream of water into the valve body 102 through the inlet port 104 and discharging the stream of water from the valve body 102 through the outlet port 106 corresponding to the activated zone 30. Activating a water zone 30 may comprise aligning the outlet port aperture 146 with the outlet port 106 corresponding to the activated zone 30. The pausing arm 174 may be engaged while discharging water from the valve body 102. The rotational position of the outlet port aperture 146 may be determined.

It will be understood that implementations of a pool cycling valve are not limited to the specific assemblies, devices and components disclosed in this document, as virtually any assemblies, devices and components consistent with the intended operation of a pool cycling valve may be used. Accordingly, for example, although particular pool cycling valves, and other assemblies, devices and components are disclosed, such may include any shape, size, style, type, model, version, class, measurement, concentration, material, weight, quantity, and/or the like consistent with the intended operation of pool cycling valves. Implementations are not limited to uses of any specific assemblies, devices and components; provided that the assemblies, devices and components selected are consistent with the intended operation of a pool cycling valve.

Accordingly, the components defining any pool cycling valve implementations may be formed of any of many different types of materials or combinations thereof that can readily be formed into shaped objects provided that the components selected are consistent with the intended operation of a pool cycling valve implementation. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various pool cycling valves may be manufactured using conventional procedures as added to and improved upon through the procedures described here. Some components defining a pool cycling valve may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that pool cycling valves are not limited to the specific order of steps as disclosed in this document. Any steps or sequence of steps of the assembly of a pool cycling valve indicated herein are given as examples of possible steps or sequence of steps and not as limitations, since various assembly processes and sequences of steps may be used to assemble pool cycling valves.

The implementations of a pool cycling valve described are by way of example or explanation and not by way of limitation. Rather, any description relating to the foregoing is for the exemplary purposes of this disclosure, and implementations may also be used with similar results for a variety of other applications employing a pool cycling valve.

What is claimed is:

1. A pool cycling valve system, comprising:
a first pool cycling valve having a first valve body with a first inlet port and a first plurality of outlet ports, wherein the first pool cycling valve is configured to move a first outlet port aperture to align with a first different outlet port of the first plurality of outlet ports in response to a change of water pressure within the first valve body;
a first position sensor configured to determine a position of the first outlet port aperture;
a first pausing arm configured to interfere with the movement of the first outlet port aperture when the first pausing arm is engaged, regardless of a change of water pressure within the first valve body;
a first plurality of water zones each configured to fluidly couple with a respective outlet port of the first plurality of outlet ports;
an interface configured to receive input from a user for a user-selected sequence for activating each water zone of the first plurality of water zones, a user-selected duration of activated time per water zone prior to activation of a subsequent water zone of the first plurality of water zones, and a number of water pressure cycles for a particular water zone to receive prior to the activation of the subsequent water zone; and a microcontroller communicatively coupled to the interface, wherein the interface is configured to communicate the input to the microcontroller and the microcontroller is configured to control the first pool cycling valve, the first outlet port aperture movement, and the first pausing arm to intelligently and selectively discharge water to each of the first plurality of water zones based on the input received from the interface.

2. The pool cycling valve system of claim 1, further comprising:

a second pool cycling valve configured to move a second outlet port aperture to align with a second different outlet port of a second plurality of outlet ports of the second pool cycling valve in response to a change of water pressure within a second valve body of the second pool cycling valve;

a second position sensor configured to determine a position of the second outlet port aperture;

a second pausing arm configured to interfere with the movement of the second outlet port aperture when the second pausing arm is engaged, regardless of a change of water pressure within the second valve body; and a second plurality of water zones each configured to fluidly couple with a respective outlet port of the second plurality of outlet ports;

wherein a second inlet port of the second pool cycling valve is configured to receive water flow from a connected first outlet port of the first plurality of outlet ports; and wherein the microcontroller is further configured to control the second pool cycling valve, the second outlet port aperture movement, and the second pausing arm to intelligently and selectively discharge water to each of the second plurality of water zones based on the input received from the interface.

3. The pool cycling valve system of claim 1, wherein at least one of the duration of activated time and the number of water pressure cycles is different for each water zone of the first plurality of water zones.

4. The pool cycling valve system of claim 1, wherein the change of water pressure within the valve body is a reduction of at least 50%.

5. The pool cycling valve system of claim 1, further comprising:

a pump communicatively coupled to the microcontroller and configured to supply water to the first inlet port of the first pool cycling valve, wherein the microcontroller is configured to control the pump to supply water to the first pool cycling valve based on the input received from the interface; and a plurality of pool cleaning heads, each water zone of the first plurality of water zones fluidly coupled to a portion of the plurality of pool cleaning heads.

6. A pool cycling valve system, comprising:

at least one pool cycling valve having a valve body with an inlet port and a plurality of outlet ports;

a plurality of water zones each configured to fluidly couple with a respective outlet port of the plurality of outlet ports;

an interface configured to receive input from a user for at least one of a user-selected change in an order of activating each water zone of the plurality of water zones, a user-selected duration of activated time per water zone prior to automatic activation of a subsequent water zone of the plurality of water zones, and a number of water pressure cycles for a particular water zone to receive prior to the activation of the subsequent water zone; and a microcontroller communicatively coupled to the interface, wherein the interface is configured to communicate the input to the microcontroller and the microcontroller is configured to intelligently and selectively discharge water to each of the plurality of water zones based on the input received from the interface.

7. The pool cycling valve system of claim 6, wherein the pool cycling valve is configured to move an outlet port aperture to align with a different outlet port of the plurality of outlet ports in response to a change of water pressure within the valve body.

8. The pool cycling valve system of claim 7, further comprising a position sensor configured to determine a position of the outlet port aperture.

9. The pool cycling valve system of claim 7, further comprising an automated pausing arm configured to interfere with the movement of the outlet port aperture when the pausing arm is engaged, regardless of a change of water pressure within the valve body.

10. The pool cycling valve system of claim 7, wherein the change of water pressure within the valve body is a reduction of at least 50%.

11. The pool cycling valve system of claim 7, wherein, for each of the plurality of water zones, the duration of activated time and the number of water pressure cycles are carried out without moving the outlet port aperture to align with a different outlet port of the plurality of outlet ports.

12. The pool cycling valve system of claim 6, wherein at least one of the duration of activated time and the number of water pressure cycles is different for each water zone of the plurality of water zones.

13. The pool cycling valve system of claim 6, further comprising:

a pump communicatively coupled to the microcontroller and configured to supply water to the inlet port of the at least one pool cycling valve, wherein the microcontroller is configured to control the pump to supply water to the at least one pool cycling valve based on the input received from the interface; and a plurality of pool cleaning heads, each water zone of the plurality of water zones fluidly coupled to a portion of the plurality of pool cleaning heads.

14. A method for operating a pool cycling valve system, comprising:

receiving input from a user at an interface for at least one of a user-selected change in an order of activating each water zone of a plurality of water zones of the pool cycling valve system, a user-selected duration of activated time per water zone prior to automatic activation of a subsequent water zone of the plurality of water zones, and a number of water pressure cycles for a particular water zone to receive prior to the activation of the subsequent water zone;

communicating the input to a microcontroller of the pool cycling valve system configured to control at least one pool cycling valve of the pool cycling valve system having a valve body with an inlet port and a plurality of outlet ports, wherein each of the plurality of water zones is fluidly coupled with a respective outlet port of the plurality of outlet ports; and activating and deactivating the plurality of water zones by intelligently and selectively discharging water to each of the plurality of water zones based on the input received from the interface.

15. The method of claim 14, further comprising automatically engaging a pausing arm of the pool cycling valve system while discharging water from the valve body.

16. The method of claim 14, wherein activating the plurality of water zones comprises receiving a stream of water into the valve body through the inlet port of the valve body and discharging the stream of water from the valve body through the outlet port corresponding to the activated zone.

17. The method of claim 14, wherein activating a water zone of the plurality of water zones comprises aligning an outlet port aperture of the pool cycling valve system with the outlet port corresponding to the activated zone.

18. The method of claim 14, further comprising determining a rotational position of an outlet port aperture of the pool cycling valve system.

19. The method of claim 18, wherein the input specifies a different number of water pressure cycles for each water zone of the plurality of water zones.

20. The method of claim 14, wherein the input specifies a different duration of activated time for each water zone of the plurality of water zones.

* * * * *